US009350622B2

(12) United States Patent
Smith et al.

(10) Patent No.: US 9,350,622 B2
(45) Date of Patent: *May 24, 2016

(54) METHOD AND SYSTEM FOR REAL-TIME VISUALIZATION OF NETWORK FLOW WITHIN NETWORK DEVICE

(71) Applicant: LiveAction, Inc., Honolulu, HI (US)

(72) Inventors: John Kei Smith, Honolulu, HI (US); Robert Pierce, Honolulu, HI (US)

(73) Assignee: LiveAction, Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,890

(22) Filed: Feb. 22, 2013

(65) Prior Publication Data

US 2013/0159865 A1 Jun. 20, 2013

Related U.S. Application Data

(63) Continuation of application No. 12/431,698, filed on Apr. 28, 2009, now Pat. No. 9,003,292, which is a continuation-in-part of application No. 12/336,433, filed on Dec. 16, 2008, now Pat. No. 7,975,190, which is a continuation of application No. 11/483,054, filed on Jul. 6, 2006, now Pat. No. 7,500,158.

(51) Int. Cl.
*H04L 12/24* (2006.01)
*H04L 12/26* (2006.01)

(52) U.S. Cl.
CPC ............ *H04L 41/22* (2013.01); *H04L 12/2697* (2013.01); *H04L 41/12* (2013.01); *H04L 43/50* (2013.01); *H04L 43/087* (2013.01); *H04L 43/0829* (2013.01); *H04L 43/0852* (2013.01)

(58) Field of Classification Search
CPC ..... H04L 41/22; H04L 41/12; H04L 29/0899; G06F 9/4443; G06F 3/0481
USPC .......................................................... 715/734
See application file for complete search history.

(56) References Cited

U.S. PATENT DOCUMENTS

| | | | |
|---|---|---|---|
| 5,276,789 A * | 1/1994 | Besaw et al. ................... 345/440 |
| 5,546,540 A * | 8/1996 | White ...................... H04L 12/46 370/254 |
| 5,610,905 A | 3/1997 | Murthy et al. |
| 5,732,192 A * | 3/1998 | Malin et al. ........................ 703/2 |
| 5,768,552 A | 6/1998 | Jacoby |
| 5,909,550 A * | 6/1999 | Shankar et al. ............... 709/227 |

(Continued)

OTHER PUBLICATIONS (Clack—a Graphical Router Toolkit for Networking Education by Wendlandt, dated May 16, 2005.*

(Continued)

*Primary Examiner* — Jessica Chuang
(74) *Attorney, Agent, or Firm* — Martine Penilla Group, LLP

(57) ABSTRACT

A network topology is displayed in a graphical user interface on a display of a computer. The network topology includes graphical representations of multiple network devices, of internal interfaces within the multiple network devices, and of network connections between the multiple network devices. A record of a network flow within a particular network device of the multiple network devices is acquired in real time upon transmission of the network flow within the particular network device. A graphical representation of a transmission path of the network flow within the particular network device is rendered in real time on the display based on the record of the network flow.

20 Claims, 27 Drawing Sheets

(56) References Cited

U.S. PATENT DOCUMENTS

| | | | |
|---|---|---|---|
| 5,926,463 A | 7/1999 | Ahearn et al. | |
| 5,951,649 A | 9/1999 | Dobbins et al. | |
| 5,964,837 A * | 10/1999 | Chao et al. | 709/224 |
| 5,966,513 A | 10/1999 | Horikawa et al. | |
| 5,999,179 A | 12/1999 | Kekic et al. | |
| 6,012,088 A | 1/2000 | Li et al. | |
| 6,046,980 A * | 4/2000 | Packer | 370/230 |
| 6,108,800 A | 8/2000 | Asawa | |
| 6,134,674 A | 10/2000 | Akasheh | |
| 6,137,782 A * | 10/2000 | Sharon et al. | 370/255 |
| 6,178,531 B1 * | 1/2001 | Kolb | H04L 12/2697 370/253 |
| 6,198,725 B1 | 3/2001 | Constantin et al. | |
| 6,285,658 B1 * | 9/2001 | Packer | 370/230 |
| 6,330,597 B2 * | 12/2001 | Collin et al. | 709/220 |
| 6,405,251 B1 * | 6/2002 | Bullard | G06Q 30/04 709/224 |
| 6,442,615 B1 * | 8/2002 | Nordenstam et al. | 709/241 |
| 6,446,200 B1 * | 9/2002 | Ball | H04L 12/14 709/203 |
| 6,625,657 B1 * | 9/2003 | Bullard | H04L 12/14 709/224 |
| 6,678,474 B1 | 1/2004 | Masuda et al. | |
| 6,687,750 B1 | 2/2004 | Messinger et al. | |
| 6,693,909 B1 | 2/2004 | Mo et al. | |
| 6,721,334 B1 | 4/2004 | Ketcham | |
| 6,732,170 B2 | 5/2004 | Miyake et al. | |
| 6,735,633 B1 | 5/2004 | Welch et al. | |
| 6,751,663 B1 * | 6/2004 | Farrell | H04L 63/08 709/223 |
| 6,868,086 B1 | 3/2005 | Putzolu et al. | |
| 6,900,822 B2 | 5/2005 | Germain et al. | |
| 6,922,395 B1 * | 7/2005 | Elliott et al. | 370/241 |
| 6,934,749 B1 * | 8/2005 | Black et al. | 709/224 |
| 6,982,984 B1 | 1/2006 | Asayesh et al. | |
| 7,013,255 B1 * | 3/2006 | Smith, II | 703/21 |
| 7,020,147 B1 * | 3/2006 | Amadon et al. | 370/401 |
| 7,023,840 B2 | 4/2006 | Golla et al. | |
| 7,024,419 B1 | 4/2006 | Klenk et al. | |
| 7,042,888 B2 | 5/2006 | Berggreen | |
| 7,143,018 B2 * | 11/2006 | Gabele et al. | 703/13 |
| 7,167,860 B1 * | 1/2007 | Black | G06Q 30/04 705/35 |
| 7,180,854 B2 | 2/2007 | Cambron | |
| 7,190,712 B2 * | 3/2007 | Abraham et al. | 375/150 |
| 7,219,300 B2 | 5/2007 | Arquie et al. | |
| 7,243,143 B1 * | 7/2007 | Bullard | G06Q 10/06 705/30 |
| 7,245,620 B2 | 7/2007 | Shankar | |
| 7,246,370 B2 | 7/2007 | Valente et al. | |
| 7,254,114 B1 | 8/2007 | Turner et al. | |
| 7,254,778 B2 | 8/2007 | Dikhit | |
| 7,277,393 B1 | 10/2007 | Jacobson et al. | |
| 7,310,666 B2 | 12/2007 | Benfield et al. | |
| 7,313,819 B2 | 12/2007 | Burnett et al. | |
| 7,315,985 B1 * | 1/2008 | Gauvin et al. | 715/734 |
| 7,328,141 B2 * | 2/2008 | Azinger | 703/6 |
| 7,376,087 B2 * | 5/2008 | Srikrishna | H04L 12/2602 370/238 |
| 7,386,628 B1 | 6/2008 | Hansell et al. | |
| 7,391,793 B2 | 6/2008 | Brissette et al. | |
| 7,392,539 B2 | 6/2008 | Brooks et al. | |
| 7,415,038 B2 | 8/2008 | Ullmann et al. | |
| 7,415,507 B1 * | 8/2008 | Ward | H04L 49/70 709/217 |
| 7,417,950 B2 | 8/2008 | Hofmeister et al. | |
| 7,420,973 B2 * | 9/2008 | Becker Hof et al. | 370/392 |
| 7,437,469 B2 | 10/2008 | Ellanti et al. | |
| 7,447,768 B2 * | 11/2008 | Kelly et al. | 709/224 |
| 7,466,703 B1 | 12/2008 | Arunachalam et al. | |
| 7,489,720 B2 | 2/2009 | Hinton et al. | |
| 7,492,720 B2 | 2/2009 | Pruthi et al. | |
| 7,529,192 B2 | 5/2009 | Labovitz | |
| 7,564,865 B2 | 7/2009 | Radulescu | |
| 7,580,356 B1 * | 8/2009 | Mishra et al. | 370/230.1 |
| 7,584,298 B2 * | 9/2009 | Klinker et al. | 709/238 |
| 7,606,160 B2 | 10/2009 | Klinker et al. | |
| 7,623,527 B2 | 11/2009 | Mitani et al. | |
| 7,636,305 B1 * | 12/2009 | Taylor et al. | 370/230 |
| 7,636,318 B2 * | 12/2009 | Nandy | H04L 41/0896 370/242 |
| 7,644,375 B1 | 1/2010 | Anderson et al. | |
| 7,649,834 B2 | 1/2010 | Badat et al. | |
| 7,653,074 B2 | 1/2010 | Asayesh et al. | |
| 7,660,256 B2 * | 2/2010 | Nagami et al. | 370/241 |
| 7,660,290 B2 | 2/2010 | Nagami et al. | |
| 7,660,892 B2 * | 2/2010 | Choong et al. | 709/224 |
| 7,684,390 B2 | 3/2010 | Navada et al. | |
| 7,689,918 B2 | 3/2010 | Sauvageau | |
| 7,729,357 B2 * | 6/2010 | Strater | H04L 12/2697 370/241.1 |
| 7,738,442 B2 * | 6/2010 | Miyamoto et al. | 370/351 |
| 7,773,541 B2 * | 8/2010 | Davison et al. | 370/254 |
| 7,782,796 B2 | 8/2010 | Haley et al. | |
| 7,787,770 B2 | 8/2010 | Aubin et al. | |
| 7,827,499 B2 | 11/2010 | Hao et al. | |
| 7,849,408 B1 | 12/2010 | Messinger et al. | |
| 7,849,497 B1 | 12/2010 | Hurst et al. | |
| 7,900,240 B2 | 3/2011 | Terzis et al. | |
| 7,940,768 B2 * | 5/2011 | Masputra | H04L 45/00 370/392 |
| 7,948,916 B2 | 5/2011 | Mandavilli et al. | |
| 7,948,994 B2 * | 5/2011 | Shen | 370/400 |
| 7,957,394 B1 * | 6/2011 | Cohen et al. | 370/395.21 |
| 7,958,208 B2 | 6/2011 | Manthoulis et al. | |
| 7,970,899 B2 * | 6/2011 | Wiryaman et al. | 709/225 |
| 7,983,158 B2 * | 7/2011 | Guo et al. | 370/230 |
| 7,995,479 B2 * | 8/2011 | Zavgren, Jr. | 370/237 |
| 8,027,273 B2 * | 9/2011 | Nguyen | 370/254 |
| 8,032,625 B2 | 10/2011 | Benfield et al. | |
| 8,064,455 B2 | 11/2011 | Masputra et al. | |
| 8,073,777 B2 * | 12/2011 | Barry et al. | 705/50 |
| 8,074,124 B2 | 12/2011 | Bouchard et al. | |
| 8,077,718 B2 | 12/2011 | Mortier et al. | |
| 8,095,640 B2 * | 1/2012 | Guingo | H04L 41/5009 709/224 |
| 8,130,661 B2 | 3/2012 | Kannan et al. | |
| 8,130,767 B2 | 3/2012 | Aitken et al. | |
| 8,165,019 B2 * | 4/2012 | Breslau et al. | 370/229 |
| 8,189,587 B2 | 5/2012 | Masputra et al. | |
| 8,204,974 B1 | 6/2012 | Bhattacharyya et al. | |
| 8,213,322 B2 | 7/2012 | Jones et al. | |
| 8,255,599 B2 | 8/2012 | Shaikli | |
| 8,274,895 B2 | 9/2012 | Rahman et al. | |
| 8,289,966 B1 | 10/2012 | Fricke et al. | |
| 8,290,367 B2 | 10/2012 | Reina et al. | |
| 8,295,175 B2 | 10/2012 | Ellis et al. | |
| 8,331,237 B2 * | 12/2012 | Umeda | 370/236 |
| 8,331,387 B2 | 12/2012 | Kwan et al. | |
| 8,332,782 B1 | 12/2012 | Chang et al. | |
| 8,339,963 B2 | 12/2012 | Babiarz et al. | |
| 8,339,992 B2 | 12/2012 | Chen et al. | |
| 8,427,959 B2 * | 4/2013 | Alvarez | H04L 45/00 370/238 |
| 8,437,369 B2 | 5/2013 | Shaikli | |
| 8,451,731 B1 | 5/2013 | Lee et al. | |
| 8,472,451 B2 | 6/2013 | Shen | |
| 8,654,655 B2 * | 2/2014 | Silveira Filho et al. | 370/244 |
| 8,699,356 B2 * | 4/2014 | Smart | H04L 12/2697 370/242 |
| 8,976,689 B2 * | 3/2015 | Ciavattone | H04L 43/10 370/236 |
| 9,003,292 B2 * | 4/2015 | Smith | H04L 12/2697 715/733 |
| 2002/0012348 A1 | 1/2002 | Mizuhara et al. | |
| 2002/0016937 A1 * | 2/2002 | Houh | 714/43 |
| 2002/0057699 A1 | 5/2002 | Roberts | |
| 2002/0065919 A1 | 5/2002 | Taylor et al. | |
| 2002/0103631 A1 | 8/2002 | Feldmann et al. | |
| 2002/0131365 A1 | 9/2002 | Barker et al. | |
| 2002/0143926 A1 | 10/2002 | Maltz et al. | |
| 2002/0143929 A1 * | 10/2002 | Maltz et al. | 709/224 |
| 2003/0043815 A1 | 3/2003 | Tinsley et al. | |
| 2003/0058802 A1 | 3/2003 | Jones et al. | |

(56) References Cited

U.S. PATENT DOCUMENTS

| | | | |
|---|---|---|---|
| 2003/0081595 A1 | 5/2003 | Nomura et al. | |
| 2003/0086422 A1* | 5/2003 | Klinker et al. | 370/389 |
| 2003/0091049 A1* | 5/2003 | Abe et al. | 370/392 |
| 2003/0097438 A1* | 5/2003 | Bearden et al. | 709/224 |
| 2003/0112958 A1 | 6/2003 | Beaudoin et al. | |
| 2003/0198234 A1 | 10/2003 | Pin | |
| 2003/0214913 A1 | 11/2003 | Kan et al. | |
| 2004/0015571 A1* | 1/2004 | Miyazaki et al. | 709/220 |
| 2004/0032872 A1* | 2/2004 | Dhara | 370/401 |
| 2004/0061701 A1 | 4/2004 | Arquie et al. | |
| 2004/0156313 A1 | 8/2004 | Hofmeister et al. | |
| 2004/0184489 A1 | 9/2004 | Brissette et al. | |
| 2004/0240455 A1* | 12/2004 | Shen | 370/400 |
| 2005/0018602 A1* | 1/2005 | Labovitz | 370/229 |
| 2005/0078602 A1 | 4/2005 | Mancour et al. | |
| 2005/0094567 A1 | 5/2005 | Kannan et al. | |
| 2005/0105469 A1 | 5/2005 | Hao | |
| 2005/0120099 A1 | 6/2005 | Marce et al. | |
| 2005/0175001 A1* | 8/2005 | Becker Hof et al. | 370/389 |
| 2005/0198247 A1 | 9/2005 | Perry et al. | |
| 2005/0220282 A1* | 10/2005 | Azinger | 379/112.01 |
| 2005/0229246 A1* | 10/2005 | Rajagopal et al. | 726/14 |
| 2005/0232229 A1* | 10/2005 | Miyamoto et al. | 370/351 |
| 2005/0234920 A1 | 10/2005 | Rhodes | |
| 2006/0023638 A1* | 2/2006 | Monaco et al. | 370/252 |
| 2006/0028999 A1* | 2/2006 | Iakobashvili et al. | 370/252 |
| 2006/0031312 A1* | 2/2006 | Ellanti et al. | 709/206 |
| 2006/0034304 A1* | 2/2006 | Asayesh et al. | 370/401 |
| 2006/0129939 A1* | 6/2006 | Nelles et al. | 715/736 |
| 2006/0146723 A1 | 7/2006 | Navada et al. | |
| 2006/0168206 A1* | 7/2006 | Choong et al. | 709/224 |
| 2006/0182034 A1* | 8/2006 | Klinker et al. | 370/238 |
| 2006/0217115 A1* | 9/2006 | Cassett et al. | 455/423 |
| 2006/0268739 A1* | 11/2006 | Garcia et al. | 370/254 |
| 2006/0285495 A1 | 12/2006 | Aitken et al. | |
| 2007/0016666 A1* | 1/2007 | Duffield et al. | 709/223 |
| 2007/0019548 A1* | 1/2007 | Krishnamurthy | 370/232 |
| 2007/0041317 A1 | 2/2007 | Haley et al. | |
| 2007/0058631 A1 | 3/2007 | Mortier et al. | |
| 2007/0201359 A1 | 8/2007 | Matsubara et al. | |
| 2007/0208854 A1* | 9/2007 | Wiryaman et al. | 709/225 |
| 2007/0213966 A1* | 9/2007 | Noble | 703/13 |
| 2007/0214412 A1 | 9/2007 | Arquie et al. | |
| 2007/0268294 A1* | 11/2007 | Eagen et al. | 345/474 |
| 2008/0005156 A1 | 1/2008 | Edwards et al. | |
| 2008/0037432 A1* | 2/2008 | Cohen et al. | 370/241 |
| 2008/0049631 A1* | 2/2008 | Morrill | 370/250 |
| 2008/0181463 A1 | 7/2008 | Error | |
| 2008/0183860 A1 | 7/2008 | Error | |
| 2008/0184113 A1 | 7/2008 | Error | |
| 2008/0184357 A1 | 7/2008 | Drako et al. | |
| 2009/0003333 A1* | 1/2009 | Davison et al. | 370/389 |
| 2009/0070455 A1 | 3/2009 | Cervantes | |
| 2009/0083266 A1 | 3/2009 | Poola et al. | |
| 2009/0168648 A1* | 7/2009 | Labovitz et al. | 370/229 |
| 2009/0265786 A1 | 10/2009 | Xie et al. | |
| 2009/0304000 A1 | 12/2009 | Masputra et al. | |
| 2009/0304005 A1* | 12/2009 | Masputra et al. | 370/395.32 |
| 2010/0074141 A1* | 3/2010 | Nguyen | 370/254 |
| 2010/0188976 A1* | 7/2010 | Rahman et al. | 370/235 |
| 2010/0211570 A1 | 8/2010 | Ghanea-Hercock et al. | |
| 2010/0281388 A1* | 11/2010 | Kane et al. | 715/736 |
| 2010/0325588 A1 | 12/2010 | Reddy et al. | |
| 2011/0276887 A1* | 11/2011 | Cohen et al. | 715/736 |
| 2012/0257608 A1 | 10/2012 | Masputra et al. | |
| 2013/0114612 A1* | 5/2013 | Singh et al. | 370/401 |

OTHER PUBLICATIONS

ILOG JViews 5.5 Graph Layout User's Manual dated Dec. 2002.*

* cited by examiner

| Test Case | Router | Time | | | Test Generator | | | Router Configuration | | | Router Monitoring | | | | Test Analyzer | | |
|---|---|---|---|---|---|---|---|---|---|---|---|---|---|---|---|---|---|
| | | | | Type | Rate | Length | Queue | Bandwidth Guarantee | Policer Bandwidth | CPU | Memory | Pre Policy Rate | Post Policy Rate | Jitter (ms) | Rate | Latency |
| Case 1 | Cisco 871 | Time 0 | Overall | | | | | | | 23% | 7% | | | | | |
| | | | Class A | UDP-RTP | 125Kbps | Fixed-300 bytes | Priority | 100Kbps | 110Kbps | | | 125 | 110 | 100 | 125 | 8ms |
| | | | Class B | TCP-Telnet | 150Kbps | Fixed-500 bytes | Class based | 200Kbps | 210Kbps | | | 150 | 150 | 250 | 150 | 10ms |
| | | | Class C | TCP-HTTP | 175Kbps | Fixed-1000 bytes | Class based | 300Kbps | 310Kbps | | | 175 | 175 | 250 | 175 | 10ms |
| | | Time 1 | | | | | | | | 28% | 7% | | | | | |
| | | | Class A | UDP-RTP | 200Kbps | Fixed-300 bytes | Priority | 100Kbps | 110Kbps | | | 200 | 110 | 100 | 110 | 8ms |
| | | | Class B | TCP-Telnet | 250Kbps | Fixed-500 bytes | Class based | 200Kbps | 210Kbps | | | 250 | 210 | 250 | 210 | 10ms |
| | | | Class C | TCP-HTTP | 300Kbps | Fixed-1000 bytes | Class based | 300Kbps | 310Kbps | | | 300 | 300 | 250 | 300 | 10ms |
| | | | Class D | UDP-SNMP | 350Kbps | Gaussian-2500 bytes | Class based | 400Kbps | 410Kbps | | | 350 | 350 | 250 | 350 | 12ms |
| | | Time 2 | | | | | | | | 33% | 7% | | | | | |
| | | | Class A | UDP-RTP | 250Kbps | Fixed-300 bytes | Priority | 100Kbps | 110Kbps | | | 250 | 110 | 100 | 110 | 8ms |
| | | | Class B | TCP-Telnet | 300Kbps | Fixed-500 bytes | Class based | 200Kbps | 210Kbps | | | 300 | 210 | 250 | 210 | 10ms |
| | | | Class C | TCP-HTTP | 350Kbps | Fixed-1000 bytes | Class based | 300Kbps | 310Kbps | | | 350 | 310 | 250 | 310 | 10ms |
| | | | Class D | UDP-SNMP | 400Kbps | Gaussian-2500 bytes | Class based | 400Kbps | 410Kbps | | | 400 | 400 | 250 | 400 | 15ms |
| | | | Class E | TCP-HTTPS | 450Kbps | Ramp-1000 to 2000 bytes | Class based | 500Kbps | 510Kbps | | | 450 | 450 | 250 | 450 | 15ms |
| | | | Class F | TCP-FTP | 500Kbps | Ramp-1500 to 2500 bytes | Class based | 600Kbps | 610Kbps | | | 500 | 500 | 250 | 500 | 15ms |

Fig. 3

| Input | | Network Device Statistics | | | | | | | | | | | |
|---|---|---|---|---|---|---|---|---|---|---|---|---|---|
| | | System | | Class Based Queue Stats | | | | Output | | | | | |
| Test Number | Test Setup # in Test Table (Fig. 4B) | Flow # in Flow Table (Fig. 4D) | CPU Usage | Memory Usage | Pre Queue Rate | Post Queue Rate | Queue Depth | Packet Drops | Output Rate | Jitter Max | Jitter Min | Latency Min | Latency Max | Bit Error | Drop | Reorder |
| 1 | 1 | 1 | 12% | 3% | 60 | 60 | 0 | 0 | 60 | 3 ms | 1 ms | 35 ms | 35 ms | 0 | 0% | 0% |
| 2 | 1 | 2 | 12% | 3% | 70 | 70 | 0 | 0 | 70 | 2 ms | 2 ms | 36 ms | 36 ms | 0 | 0% | 0% |
| 3 | 1 | 3 | 12% | 3% | 80 | 72 | 3 | 8 | 80 | 1 ms | 3 ms | 37 ms | 37 ms | 0 | 3% | 0% |
| 4 | 1 | 4 | 15% | 3% | 90 | 72 | 4 | 18 | 90 | 0 ms | 4 ms | 38 ms | 38 ms | 1 | 3% | 0% |
| 5 | 2 | 1 | 12% | 3% | 80 | 72 | 4 | 8 | 80 | 1 ms | 5 ms | 39 ms | 39 ms | 0 | 3% | 0% |
| 6 | 2 | 2 | 12% | 3% | 70 | 70 | 0 | 0 | 70 | 2 ms | 6 ms | 40 ms | 40 ms | 0 | 0% | 0% |
| 7 | 2 | 3 | 12% | 3% | 60 | 60 | 0 | 0 | 60 | 3 ms | 7 ms | 41 ms | 41 ms | 0 | 0% | 0% |

Fig. 4A

Test Table

| Test Setup Number | Router # in Router Table (Fig. 4C) | Test On Interface |
|---|---|---|
| 1 | 1 | FA0 |
| 2 | 1 | FA1 |
| 3 | 2 | FA1 |

Fig. 4B

Router Table

| Router Number | Router | IOS | HW | Memory installed | Policy Name |
|---|---|---|---|---|---|
| 1 | 871 | 12.3 T | HWIC | 256 MB | test_policy1 (Fig. 4E) |
| 2 | 2811 | 12.4 | HWC | 512 MB | test_policy1 (Fig. 4E) |

Fig. 4C

Flow Table

| Flow Number | Packet Type | Length | Distribution | Source Port | Destination Port | Rate | Characterisitics |
|---|---|---|---|---|---|---|---|
| 1 | UDP | 200 | Fixed | 45 | 4555 | 1000 | Periodic |
| 2 | TCP | 500 | Fixed | 80 | 5000 | 1000 | Periodic |
| 3 | UDP | 1000 | Fixed | 1223 | 356 | 1000 | Periodic |
| 4 | TCP | 2000 | Quad | 2222 | 355 | 1000 | Periodic |
| 5 | TCP | 5000 | Quad | 2345 | 355 | 1000 | Bursty |

Fig. 4D

| test_policy1 | | |
|---|---|---|
| Class ID | Class Type | Class Description |
| A | Voice | Priority, 25% Bandwidth |
| B | Transactional | 25% Bandwidth |
| C | Bulk | 10% Bandwidth, Policing Plan A |
| D | Scavenger | 3% Bandwidth, Policing Plan B |
| E | Business Critical | 10% Bandwidth |
| F | Default | 25% Bandwidth |

Fig. 4E

| Router | | | | Forwarding Limits | | | | | | Output Behavior | | | | |
|---|---|---|---|---|---|---|---|---|---|---|---|---|---|---|
| Number | Model | IOS | Interface | Input | CPU | CPU Usage Base on Input Rate | | | Input (Kbps) | Queue Depth | Queue Type | | Jitter | Latency |
| | | | | | | 25% | 50% | 75% | | | | | | |
| 1 | 871 | 12.3.1 | FE | 40 Mbps | 80% | 10 Mbps | 20 Mpbs | 30 Mbps | | | | | | |
| | | | | | | | | | 250 | 0 | Priority | | 100ns | 8 ms |
| | | | | | | | | | 300 | 0 | Priority | | 100ns | 10ms |
| | | | | | | | | | 350 | 2 | Priority | | 100ns | 10ms |
| | | | | | | | | | 400 | 3 | Priority | | 100ns | 10ms |
| | | | | | | | | | 300 | 5 | Class | | 250ns | 10ms |
| | | | | | | | | | 350 | 5 | Class | | 250ns | 10ms |
| | | | | | | | | | 400 | 5 | Class | | 250ns | 15ms |
| | | | | | | | | | 500 | 10 | Class | | 250ns | 15ms |
| 2 | 871 | 12.3.11 | FE | 40 Mbps | 85% | 10 Mbps | 20 Mpbs | 30 Mbps | | | | | | |
| | | | | | | | | | 250 | 0 | Priority | | 110 ns | 10ms |
| | | | | | | | | | 300 | 0 | Priority | | 110 ns | 10ms |
| | | | | | | | | | 350 | 2 | Priority | | 110 ns | 10ms |
| | | | | | | | | | 400 | 3 | Priority | | 110 ns | 10ms |
| | | | | | | | | | 300 | 5 | Class | | 245 ns | 20ms |
| | | | | | | | | | 350 | 5 | Class | | 245 ns | 20ms |
| | | | | | | | | | 400 | 5 | Class | | 245 ns | 20ms |
| | | | | | | | | | 500 | 10 | Class | | 245 ns | 20ms |

Fig. 5A

| Best practices | |
|---|---|
| Rule 1 | Real time traffic should never reserve more than 1/3 of the entire bandwidth |
| Rule 2 | Policer rate values should be higher than minimum bandwidth gurantee values |
| Rule 3 | Turning on header compression can use excessive CPU |
| Rule 4 | Low bandwidth links should use fragmentation to reduce serialization delays |
| Rule 5 | Application statistics are not supported on Cisco 871 models |

Fig. 5B

| Sampling Data over Time | | | |
|---|---|---|---|
| Application | Type | Average Rate % of 100 Mbps | Peak Rate % of 100Mbps |
| RTP | Real Time - Voice | 18 | 20 |
| FTP | Bulk | 6 | 8 |
| HTTP | Bulk | 6 | 12 |
| Microsoft Exchange | Transactional | 3 | 5 |
| Telnet | Transactional | 2 | 5 |

Fig. 5C

| Device ID | Interface ID | Interface Name | Interface Type | Interface Address | Subnet Mask |
|---|---|---|---|---|---|
| 1 | 1 | Fast Ethernet 0 | Fast Ethernet | 1.0.0.1 | 255.255.255.0 |
| 1 | 2 | Fast Ethernet 1 | Fast Ethernet | 2.0.0.1 | 255.255.255.0 |
| 1 | 3 | Vlan 1 | Fast Ethernet | 3.0.0.1 | 255.255.255.0 |
| 1 | 4 | Serial 0/0 | T1 | 4.0.0.1 | 255.255.255.0 |
| 1 | 5 | Serial 0/1 | T1 | 5.0.0.1 | 255.255.255.0 |
| 2 | 1 | Fast Ethernet 0 | Fast Ethernet | 1.0.0.2 | 255.255.255.0 |
| 2 | 2 | Fast Ethernet 1 | Fast Ethernet | 2.0.0.2 | 255.255.255.0 |
| 2 | 3 | Serial 1 | T1 | 3.0.0.2 | 255.255.255.0 |
| 3 | 1 | Fast Ethernet 0 | Fast Ethernet | 1.0.0.3 | 255.255.255.0 |
| 3 | 2 | Fast Ethernet 1 | Fast Ethernet | 2.0.0.3 | 255.255.255.0 |

METHOD AND SYSTEM FOR REAL-TIME VISUALIZATION OF NETWORK FLOW WITHIN NETWORK DEVICE

CLAIM OF PRIORITY

This application is a continuation under 35 U.S.C. 120 of prior U.S. application Ser. No. 12/431,698, filed Apr. 28, 2009, entitled "System and Method for Network Topology and Flow Visualization," which is a continuation-in-part application under 35 U.S.C. 120 of prior U.S. application Ser. No. 12/336,433, filed Dec. 16, 2008, entitled "System and Method for Network Device Configuration," and issued as U.S. Pat. No. 7,975,190, which is a continuation application under 35 U.S.C. 120 of prior U.S. application Ser. No. 11/483,054, filed Jul. 6, 2006, entitled "System and Method for Network Device Configuration," and issued as U.S. Pat. No. 7,500,158. The disclosures of the above-identified applications are incorporated in their entirety herein by reference.

U.S. GOVERNMENT LICENSE

The U.S. Government has a paid-up license in this invention and the right in limited circumstances to require the patent owner to license others on reasonable terms as provided for by the terms of Contract No. N00014-07-C-0542 awarded by The Office of Naval Research.

BACKGROUND

In today's highly networked world, it is important for computer and network professionals to have knowledge of network hardware and software configurations, network connections, and how data flows through the network under various conditions. A given network may include a very large number of diverse network devices. Such network devices may include, but are not limited to, routers, network hubs, switches, repeaters, network interface cards, and other related networking infrastructure. Therefore, it should be appreciated that obtaining an accurate global understanding of a given network's configuration and performance can be quite challenging. Also, in order to increase efficiency, bandwidth, and functionality of a given network, it is necessary to have a global understanding of how the given network is configured and how data traverses through the given network. Moreover, as new network devices are introduced into a given network, network management professionals are strained to understand how introduction of the new network devices may impact network operation, quality of service (QoS), and other aspects of network performance.

SUMMARY

In one embodiment, a method is disclosed for real-time network flow visualization within a network device. The method includes displaying a network topology in a graphical user interface on a display of a computer. The network topology includes graphical representations of multiple network devices, graphical representations of internal interfaces within the multiple network devices, and graphical representations of network connections between the multiple network devices. The method includes acquiring a record of a network flow within a particular network device of the multiple network devices in real time upon transmission of the network flow within the particular network device. The method also includes rendering in real time on the display a graphical representation of a transmission path of the network flow within the particular network device based on the record of the network flow.

In another embodiment, a system is disclosed for real-time network flow visualization within a network device. The system includes multiple network devices operating to transmit multiple network flows through a network. Each of the multiple network devices includes one or more internal interfaces. The system also includes a computer operating to display a network topology of the network in a graphical user interface on a display connected to the computer. The network topology includes graphical representations of multiple network devices, graphical representations of internal interfaces within the multiple network devices, and graphical representations of network connections between the multiple network devices. The computer operates to acquire a record of a network flow within a particular network device of the multiple network devices in real time upon transmission of the network flow within the particular network device. The computer also operates to render on the display in real time a graphical representation of a transmission path of the network flow within the particular network device based on the record of the network flow.

In another embodiment, a method is disclosed for visualizing a network topology. The method includes acquiring device configuration data from a number of network devices through which network flows are to be transmitted. The acquired device configuration data is analyzed to identify one or more interfaces of each of the number of network devices, and to identify subnets to which the one or more interfaces connect. The method includes rendering in a visual display of a computer system a number of device objects corresponding to the number of network devices. Also, a number of interface objects are rendered in the visual display within each of the number of device objects. Each interface object represents a particular identified interface of the network device that corresponds to the rendered device object. The method also includes rendering in the visual display a number of subnet objects corresponding to the identified subnets. Line segments are rendered in the visual display to extending between interface objects and subnet objects. The line segments represent network connections over which network flows are to be transmitted.

In another embodiment, a method is disclosed for visualizing a network flow over a network topology. The method includes an operation for generating a topology view of a network on a visual display of a computer system. The topology view includes subnet objects, network device objects, and interface objects within the network device objects. The method also includes an operation for acquiring network flow records from each device within the network. The method further includes an operation for correlating separate network flow records acquired from different devices in the network together into a common network flow record. Each of the separate network flow records shares a common source address and a common destination address. The common network flow record specifies transmission path segments of a communication through the network. The method also includes an operation for rendering in the visual display the common network flow over the topology view of the network by displaying an arrow for each transmission path segment traversed by the communication through the network.

In another embodiment, a system for visualizing a network flow over a network topology is disclosed. The system includes a device information management module defined to acquire device configuration data from a number of devices within a network. The system also includes a network visualization module defined to analyze the acquired device configuration data to identify one or more interfaces of each of the number of devices, and to identify subnets to which the one or more interfaces connect. The network visualization module is further defined to render in a visual display a topology view of the network including graphical representations of the devices, interfaces within the devices, and connections between the interfaces and subnets. The system also includes a network flow collection management module defined to acquire network flow records from each device within the network. The system also includes a network flow correlation module defined to correlate separate network flow records acquired from different devices in the network together into a common network flow record. Each of the separate network flow records shares a common source address and a common destination address. The common network flow record specifies transmission path segments of a communication through the network. The network visualization module is further defined to render in the visual display the common network flow over the topology view of the network by displaying an arrow for each transmission path segment traversed by the communication through the network.

Other aspects of the invention will become apparent from the following detailed description, taken in conjunction with the accompanying drawings, illustrating by way of example the principles of the invention.

BRIEF DESCRIPTION OF THE DRAWINGS

FIG. 3 is an illustration showing an exemplary table of test case information and associated results, in accordance with one embodiment of the present invention;

FIGS. 4A through 4E are illustrations showing an alternative representation of test case information and associated results, in accordance with one embodiment of the present invention;

FIG. 5A is an illustration showing an exemplary knowledge database schema with test results data populated therein, in accordance with one embodiment of the present invention;

FIG. 5B is an illustration showing an extension of the knowledge database schema of FIG. 5A to include best practices data, in accordance with an exemplary embodiment of the present invention;

FIG. 5C is an illustration showing an extension of the knowledge database schema of FIG. 5A to include historical data, in accordance with an exemplary embodiment of the present invention;

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
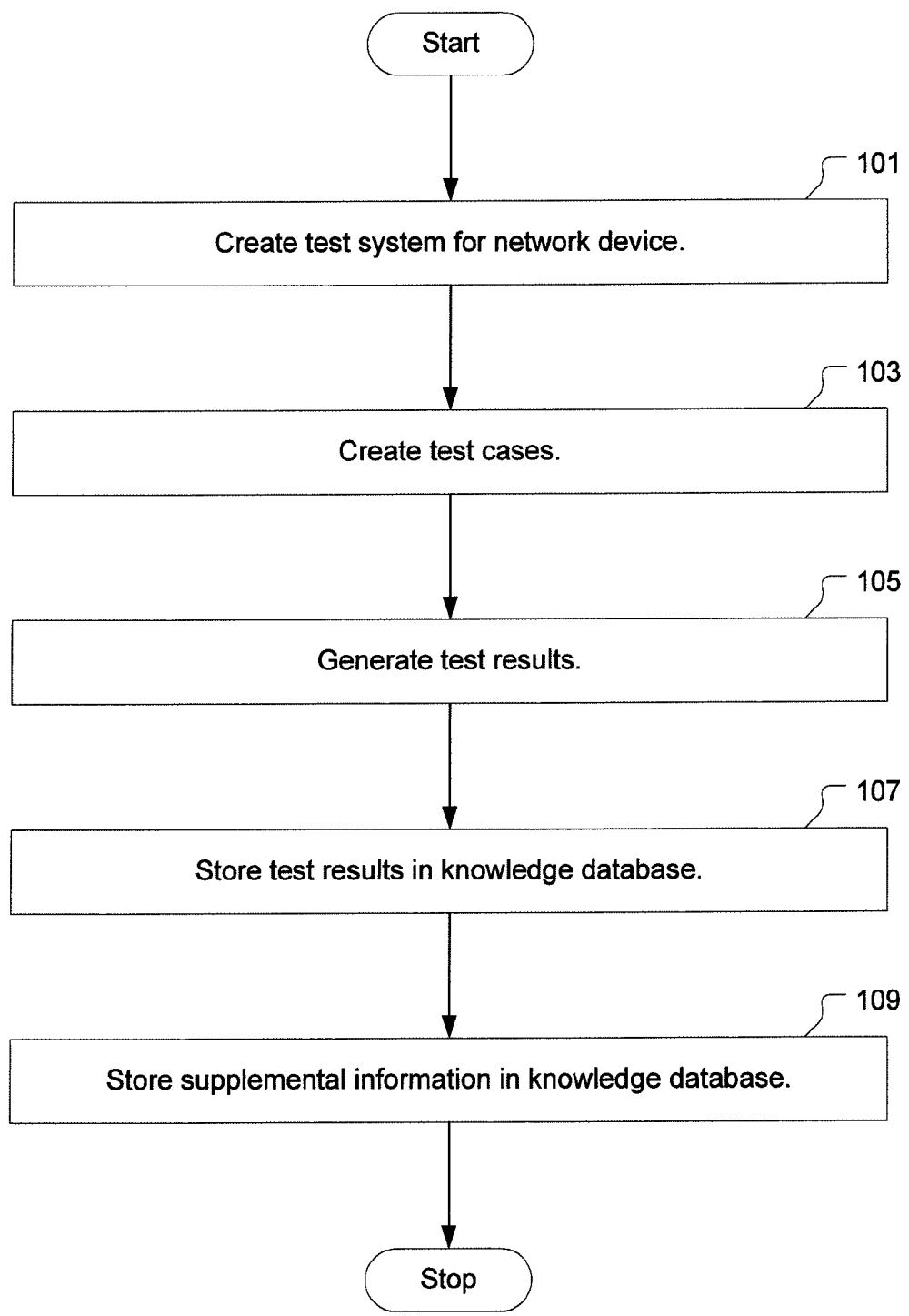
FIG. 1 is an illustration showing a flowchart of a method for generating a network device knowledge database, in accordance with one embodiment of the present invention.

FIG. 1 is an illustration showing a flowchart of a method for generating a network device knowledge database, in accordance with one embodiment of the present invention. The method begins with an operation 101 for creating a test system for a network device. The network device can represent any type of device through which data traffic is transferred during network communication. For example, in one embodiment the network device is a router.

Figure 2:
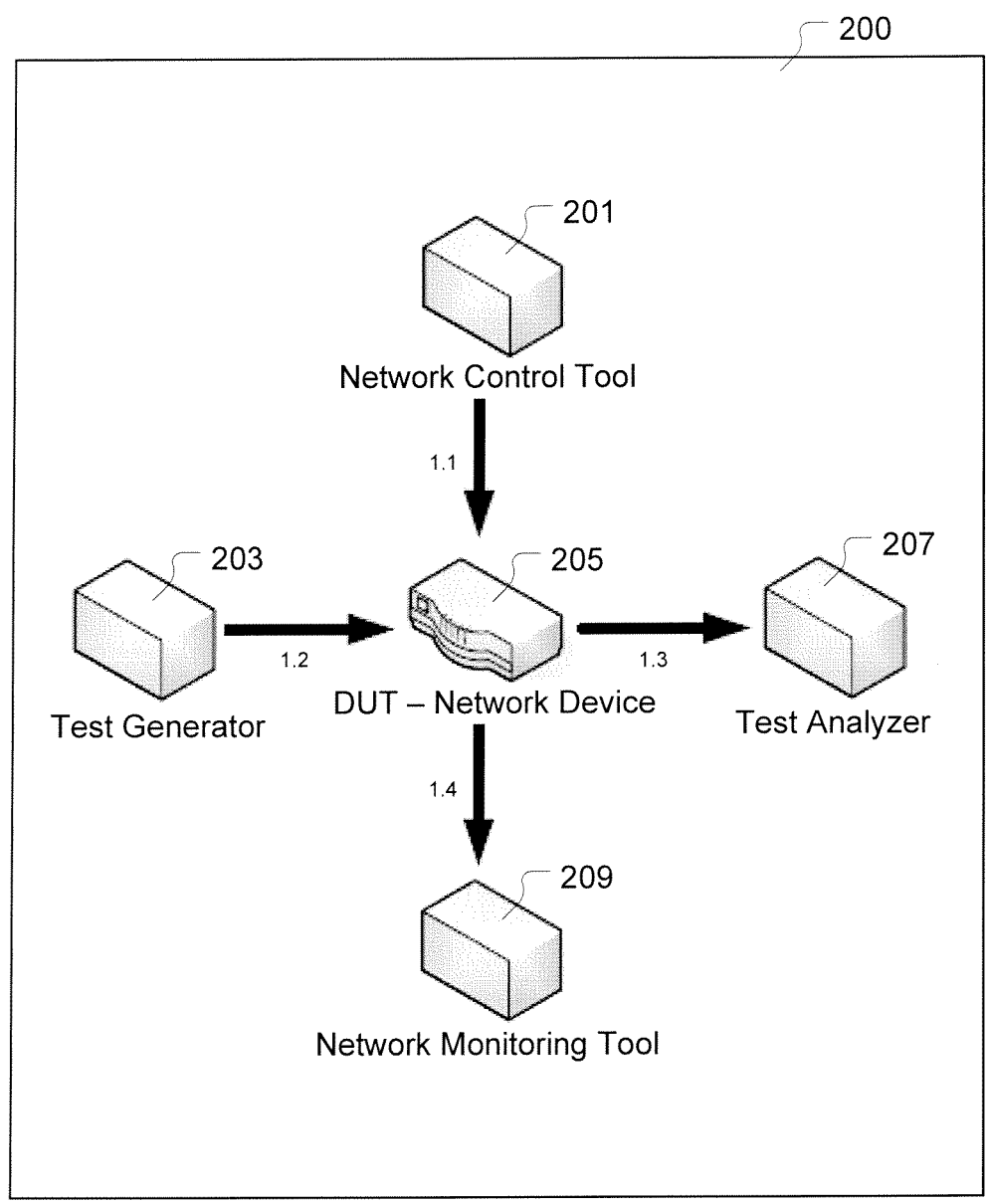
FIG. 2 is an illustration showing a test system, in accordance with one embodiment of the present invention.

FIG. 2 is an illustration showing a test system 200 created in the operation 101, in accordance with one embodiment of the present invention. The test system 200 includes a device under test (DUT) 205 connected to receive data communications from a network control tool 201 and a test generator 203, as indicated by arrows (1.1) and (1.2), respectively. In one embodiment, the DUT 205 is a router. However, it should be appreciated that the DUT 205 can also be any type of networking device other than a router. Additionally, in one embodiment, rather than the DUT 205, a system under test (SUT) is connected within the test system 200, wherein the SUT can represent any combination of network devices. For ease of description, the test system 200 will be described hereafter as including the DUT 205.

The network control tool 201 is a software module defined to enable a user, e.g., a network test engineer, to apply a configuration to the DUT 205. One example of the network control tool 201 is a configuration interface uniquely associated with the DUT 205. When the test system 200 is utilized to perform a particular test on the DUT 205, the user can use the network control tool 201 to configure the DUT 205 in a manner appropriate for the particular test to be performed. In one embodiment, the DUT 205 is capable of being configured in multiple ways. Therefore, the test results obtained from the test system 200 will be correlated to the particular configuration of the DUT 205 when the test is performed. Thus, it should be appreciated that configuration of the DUT 205 through the network control tool 201 can be considered as a test input.

The test generator 203 is a hardware and/or software module defined to apply network input to the DUT 205. In one embodiment, the network input takes the form of data communication, i.e., network traffic, for which the handling performance thereof by the DUT 205 is of interest. The test generator 203 is capable of simultaneously generating any number of network traffic threads to be processed as network input by the DUT 205. For example, if a test is defined to investigate how the DUT 205 handles multiple types of network traffic, the test generator 203 can be programmed to simultaneously generate the multiple types of network traffic.

The test system 200 further includes a test analyzer 207 and a network monitoring tool 209, which are each connected to receive data from the DUT 205, as indicated by arrows (1.3) and (1.4), respectively. The test analyzer 207 is a hardware/software module defined to record the output from the DUT 205. In one embodiment, the output recorded by the test analyzer 207 takes the form of network communication data that would be output from the DUT 205 based on both the network traffic generated by the test generator 203 and the DUT 205 configuration set through the network control tool 201. The test analyzer 207 is defined to analyze the recorded output from the DUT 205 to determine various network metrics such as jitter, output rate, latency, bit errors, packet drops, reorder instances, fragmentation instances, among others. In addition to the specific network metrics identified above, it should be understood that the test analyzer 207 can be defined to determine essentially any other type of network metric.

The network monitoring tool 209 is a hardware/software module defined to monitor the internal operations of the DUT 205 during test performance. In one embodiment, the network monitoring tool 209 functions to record the state of the DUT 205 during test performance based on the state monitoring capabilities afforded by the DUT 205. In various embodiments, the network monitoring tool 209 can be defined to record device metrics such as CPU usage, memory usage, pre-policy rate, post-policy rate, queue depth, packet drops, among others. In addition to the specific device metrics identified above, it should be understood that the network monitoring tool 209 can be defined to determine essentially any other type of device metric.

Returning to the method of FIG. 1, following creation of the test system 200 for the network device, DUT 205, the method proceeds with an operation 103 for creating test cases to be performed on the network device. In one embodiment, the test cases are created manually by a network test engineer. In another embodiment, the test cases can be created automatically based on a set of general specifications provided by a network test engineer. Each test case is defined based on both the configuration of the DUT 205 as established through the network control tool 201, and the network traffic provided as input to the DUT 205 from the test generator 203. In the embodiment where the DUT 205 is a router, the configuration can be characterized by the following parameters: router model number, router operating system, router hardware, memory type and size, router policy, etc. Also, in the embodiment where the DUT 205 is a router, the input network traffic can be characterized by the following parameters: packet type, packet length, source port, destination port, data rate, data flow characteristics, etc.

Following the operation 103, the method proceeds with an operation 105 for exercising the test system 200 to generate the test results corresponding to the test cases created in operation 103. FIG. 3 is an illustration showing an exemplary table of test case information and associated results obtained by performing operations 101 through 105, in accordance with one embodiment of the present invention. It should be understood that the test case information and results presented in FIG. 3 are provided for exemplary purposes only and are not intended to represent/provide any restrictions on the types of test cases that may be performed using the present invention.

FIG. 3 shows a test case "Case 1" performed on a "Cisco 871" router. Test case "Case 1" actually represents three separate tests identified by "Time 0," "Time 1," and "Time 2," wherein each test corresponds to a particular router configuration and a particular type/combination of network input traffic. The test performed at "Time 0" is based on a router configured to have three input queues corresponding to quality of service (QoS) Class A, Class B, and Class C, respectively. Class A is specified as a priority queue having a minimum bandwidth guarantee of 100 Kbps and a policer bandwidth of 110 Kbps. Class B is specified as a class-based queue having a minimum bandwidth guarantee of 200 Kbps and a policer bandwidth of 210 Kbps. Class C is specified as another class-based queue having a minimum bandwidth guarantee of 300 Kbps and a policer bandwidth of 310 Kbps. The router configurations for the tests performed at "Time 1" and "Time 2" are specified in a manner similar to that described above for the "Time 0" test.

During the performance of the "Time 0" test, UDP-RTP packets of 300 byte fixed length are transmitted from the test generator 203 to the Class A priority queue at a rate of 125 Kbps. Also, during the performance of the "Time 0" test, TCP-Telnet packets of 500 byte fixed length are transmitted from the test generator 203 to the Class B priority queue at a rate of 150 Kbps. Also, during the performance of the "Time 0" test, TCP-HTTP packets of 1000 byte fixed length are transmitted from the test generator 203 to the Class C priority queue at a rate of 175 Kbps. The input network traffic for the tests performed at "Time 1" and "Time 2" are specified, generated, and transmitted in a manner similar to that described above for the "Time 0" test.

During the performance of each test, the network monitoring tool 209 is operated to monitor the router CPU usage, memory usage, pre-policy rate on each input queue, and post-policy rate on each input queue. For example, during the performance of "Time 0" test, the network monitoring tool 209 records a CPU usage of 23% and a memory usage of 7%. The network monitoring tool 209 confirms that the pre-policy rate on each of the QoS Class A, B, and C queues is 125 Kbps, 150 Kbps, and 175 Kbps, respectively. During the performance of "Time 0" test, the network monitoring tool 209 also records the actual post-policy rate on each of the Class A, B, and C queues as 110 Kbps, 150 Kbps, and 175 Kbps, respectively. For the tests performed at "Time 1" and "Time 2," the router (DUT 205) is also monitored through the network monitoring tool 209 in a manner similar to that described above for the "Time 0" test.

During the performance of each test, the test analyzer 207 is operated to record and analyze the router (DUT 205) output, including jitter, output rate, and latency. For example, during the performance of "Time 0" test, the jitter, output rate, and latency for the Class A queue is analyzed as 100 ns, 125 Kbps, and 8 ms, respectively. Also, during the performance of "Time 0" test, the jitter, output rate, and latency for the Class B queue is analyzed as 250 ns, 150 Kbps, and 10 ms, respectively. Similarly, during the performance of "Time 0" test, the jitter, output rate, and latency for the Class C queue is analyzed as 250 ns, 175 bps, and 10 ms, respectively. For the tests performed at "Time 1" and "Time 2," the router (DUT 205) output is recorded and analyzed with the test analyzer 207 in a manner similar to that described above for the "Time 0" test.

It should be appreciated that the specific characterizing parameters for the router configuration and test generator as presented in FIG. 3 are not intended to represent an inclusive set of characterizing parameters. For example, depending on the particular network device, there may be additional configuration parameters specified. Also, in some embodiments the input network traffic may be characterized by more parameters than type, rate, and length. Furthermore, those skilled in the art should appreciate that the internal operation of various network devices can be characterized in terms of parameters other than CPU usage, memory usage, pre-policy rate, and post-policy rate. Therefore, it should be understood that the router monitoring parameters presented in FIG. 3 are not intended to represent an inclusive set of network device monitoring parameters. Similarly, those skilled in the art should appreciate that the output of various network devices can be analyzed in terms of parameters other than jitter, output rate, and latency. Therefore, it should be understood that the test analyzer parameters presented in FIG. 3 are not intended to represent an inclusive et. Further, those skilled in the art should appreciate that the network device can easily be substituted by a system.

In addition to the foregoing, it should be appreciated that the test results generated in operation 105 of the method can be managed in a form different from that explicitly presented in FIG. 3. For example, FIGS. 4A through 4E are illustrations showing an alternative representation of test case information and associated results obtained by performing operations 101 through 105 of the method of FIG. 1, in accordance with one embodiment of the present invention.

Returning to the method of FIG. 1, the method proceeds with an operation 107 for storing the test results generated in the operation 105 in a knowledge database. It should be appreciated that the knowledge database can be defined using essentially any type of database software that supports a query function. For example, in one embodiment, the knowledge database is implemented as an SQL database. In various embodiments, the knowledge database can be defined to include all or a portion of the test results generated in operation 105. Additionally, in one embodiment, the raw test results generated in operation 105 can be consolidated through an analytical and/or comparative process to obtain an abridged version of the test results to be stored in the knowledge database. Also, the schema of the knowledge database is defined to accommodate the test results in a form required to support subsequent query operations.

FIG. 5A is an illustration showing an exemplary knowledge database schema with test results data populated therein, in accordance with one embodiment of the present invention. The knowledge database schema provides fields for database entry number, router model, router operating system, router interface, forwarding limits on input, forwarding limits on CPU, CPU usage based input rate, and output behavior. As a function of input rate, the output behavior can be specified as queue depth, queue type, jitter, and latency. It should be appreciated that the knowledge database schema of FIG. 5A does not include all the information that is available in the raw test results from operation 105. For example, the correlation between output behavior and queue structure is not provided in the schema of FIG. 5A. Thus, FIG. 5A represents an example of the knowledge database wherein the raw test results generated in operation 105 have been consolidated through an analytical and/or comparative process to obtain an abridged version of the test results to be stored in the knowledge database. The abridged version of the test results as represented by the knowledge database schema is defined based on a target application of the knowledge database. For example, the exemplary knowledge database of FIG. 5A is defined based on the consideration that dependencies between output behavior and queue structure is not significant for the target application of the knowledge database.

In addition to storing the test results in the knowledge database, the method also includes an operation 109 for storing supplemental information in the knowledge database. In one embodiment, the supplemental information can include additional information regarding best practices for network configuration, which may include limitations for the particular configuration for the particular network device, and sampled data for network operation. FIG. 5B is an illustration showing an extension of the knowledge database schema of FIG. 5A to include best practices data, in accordance with an exemplary embodiment of the present invention. As shown in FIG. 5B, the best practices schema is defined as a list of "rules." However, it should be appreciated that other embodiments can implement alternate schemas for the best practices portion of the knowledge database. FIG. 5C is an illustration showing an extension of the knowledge database schema of FIG. 5A to include historical data, i.e., sampling data over time, in accordance with an exemplary embodiment of the present invention. In one embodiment, the historical data is entered into the knowledge database according to a schema having correlated entries for application protocol, communication type, average data rate as percent of 100 Mbps, and peak data rate as percent of 100 Mbps. As with the best practices schema, it should be appreciated that other embodiments can implement alternate schemas for the historical data portion of the knowledge database.

Figure 6:
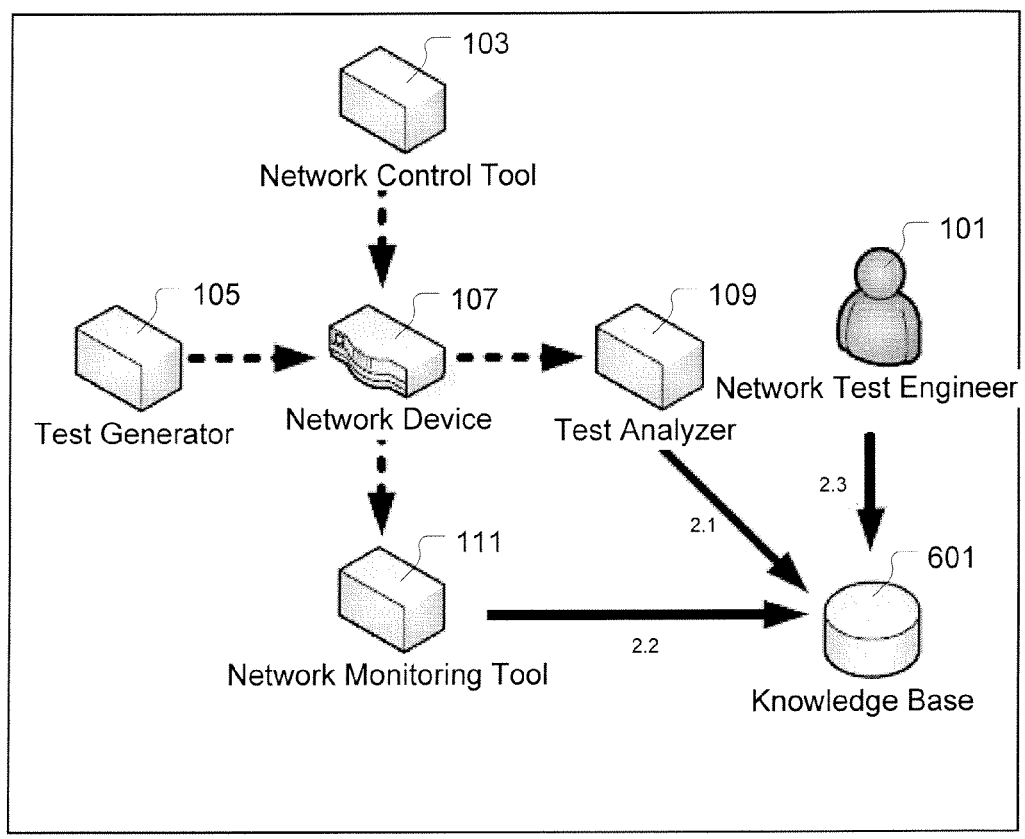
FIG. 6 is an illustration showing the interactions between the test system, the network test engineer, and the knowledge database, in accordance with one embodiment of the present invention.

FIG. 6 is an illustration showing the interactions between the test system 200, the network test engineer 101, and the knowledge base 601 in performing the operations 107 and 109, in accordance with one embodiment of the present invention. The raw test data having been recorded and analyzed by the test analyzer 109 is processed according to the requirements of the knowledge database schema and is entered into the knowledge database 601, as indicated by arrow (2.1). The raw test data having been recorded and analyzed by the test analyzer 109 is processed according to the requirements of the knowledge database schema and is entered into the knowledge database 601, as indicated by arrow (2.1). The data having been recorded by the network monitoring tool 111 is also processed according to the requirements of the knowledge database schema and is entered into the knowledge database 601, as indicated by arrow (2.2). Additionally, the network test engineer 101 directs entry of the best practices for network configuration and historical data into the knowledge database 601, as indicated by arrow (2.3).

Figure 7:
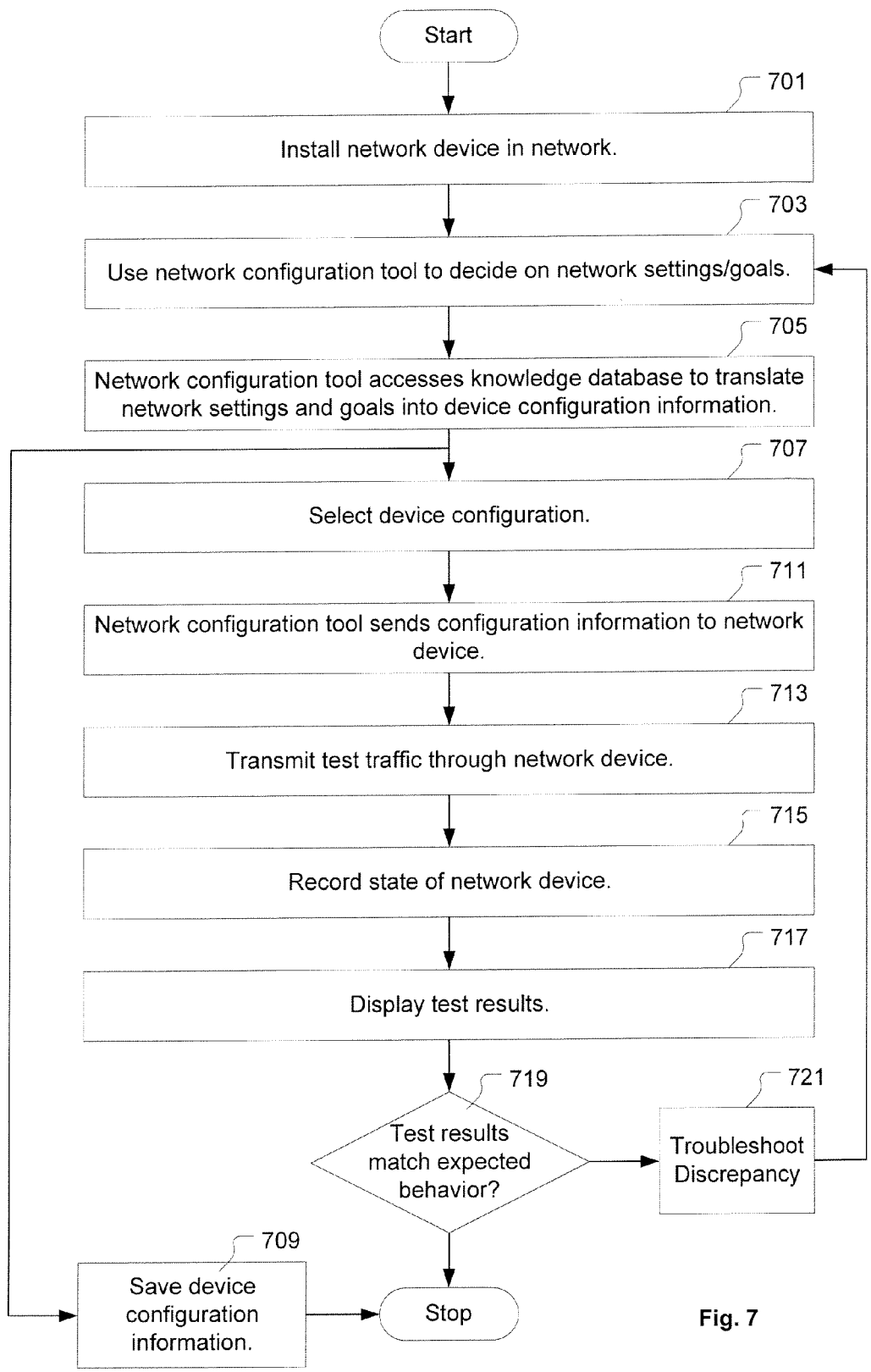
FIG. 7 is an illustration showing a flowchart of a method for optimally configuring a network device by utilizing the knowledge database developed according to the method of FIG. 1.

According to one embodiment of the present invention, FIG. 7 is an illustration showing a flowchart of a method for optimally configuring a network device by utilizing the knowledge database developed according to the method of FIG. 1. The method begins with an operation 701 for installing a network device in a network. In one embodiment, the network device is a router. However, it should be appreciated that the network device can also be any type of networking device other than a router. For the knowledge database to be directly applicable in providing information for optimally configuring the network device, the network device installed in operation 701 should correspond to the DUT 205 or SUT analyzed in the test system 200 to populate the knowledge database. However, in some embodiments, the network device installed in operation 701 may differ from the DUT 205 analyzed in the test system 200, but remain sufficiently similar to the DUT 205 such that the knowledge database content is sufficiently applicable to the network device.

The method proceeds from the operation 701 to an operation 703 in which a network engineer uses a network configuration tool to decide on network settings/goals for the network device installed in operation 701. Examples of the network settings/goals can include the various network traffic types expected to be handled by the network device, the latency goal for network traffic type, and the loss goal for each network traffic type, among others. The network setting/goals may be considered as an establishment of criteria to be satisfied by a QoS to be implemented within the network device.

The method proceeds from the operation 703 to an operation 705 in which the network configuration tool accesses the knowledge database to translate the network settings/goals from operation 703 into configuration information for the network device. In one embodiment, the network configuration tool will use the knowledge database content to formulate different configuration scenarios and choices that will satisfy the user-supplied network settings/goals. For example, the network configuration tool may use the best practices content of the knowledge database to define an input queue that is appropriate for each of the network traffic types expected to be handled by the network device. In one embodiment, the input queues are defined by queue classification, minimum bandwidth guarantee, and policing (maximum) bandwidth. For example, based on the best practices content of the knowledge database, the network configuration tool may allocate a priority queue classification to an input queue defined to handle real-time voice network traffic. Also, based on the best practices content and the historical data content of the knowledge database, the network configuration tool may allocate a minimum bandwidth guarantee value and a policing bandwidth value to each of the defined input queues.

The network configuration tool also functions to provide predicted network device performance data for each input queue defined by the network configuration tool. For example, for each defined input queue, the network configuration tool will allow a user to select a network traffic input rate, e.g., Kbps. Then, the network configuration tool will query the test results content of the knowledge database to determine network device performance data associated with the selected network traffic input rate. Examples of the types of network device performance data include latency, packet loss, jitter, packet reorder instances, bit error instances, and fragmentation instances, among others. By selecting different network traffic input rates for each input queue, the user (network engineer) can investigate how the network device will perform in handling each type of expected network traffic, given the input queue structure and QoS recommended by the network configuration tool.

Following the operation 705, the method proceeds with an operation 707 for selecting an optimized configuration for the network device based on the recommended settings and predicted results provided by the network configuration tool for the user-supplied network settings/goals. In one embodiment, the method proceeds from the operation 707 to an operation 709 for saving the selected network device configuration to a persistent storage device. The network device configuration information on the storage device can then be transmitted to another location where the actual network device is to be installed and configured. In another embodiment, the method proceeds from the operation 707 to an operation 711 for sending the selected network device configuration to the network device, such that the network device is configured accordingly.

Following operation 711, the method proceeds with a series of operations for performing verification and testing of the configured network device. In an operation 713, test traffic is transmitted through the network device. In one embodiment, the configured network device resides within a network that includes other devices that are capable of generating test traffic. In this embodiment, the network engineer performs operation 713 by programming one or more devices in the network to transmit test traffic through the configured network device to be verified and tested. In another embodiment, the verification and testing can be performed using normal network traffic transmitted through the configured network device to be verified and tested. In this embodiment, it is not necessary for the network to include devices that have the test traffic generation capability.

As the test traffic or normal network traffic is transmitted through the configured network device, an operation 715 is performed to record a state of the network device that is being verified and tested. In one embodiment, the state of the network device is recorded using the network monitoring tool 111, previously described with respect to the test system 200 of FIG. 1. In this embodiment, the network monitoring tool 111 will retrieve appropriate measurement data from the network device. Then, an operation 717 is performed to display the test results, i.e., measurement data retrieved from network device, to the network engineer. In an alternate embodiment, the test results can be stored in a persistent storage device for later review and analysis.

The method proceeds with a decision operation 719 for determining whether the test results from operation 715 match the expected behavior of the network device under test. If the test results do not demonstrate that the network device is behaving as expected, an operation 721 is performed to troubleshoot the discrepancy between the observed and expected network device behavior. The troubleshooting operation 721 directs the method back to operation 703 in which the network engineer uses the network configuration tool to decide on network setting and goals. If the test results indicate that the network device is behaving as expected, the network device is considered to be optimally configured and the method concludes.

Figure 8:
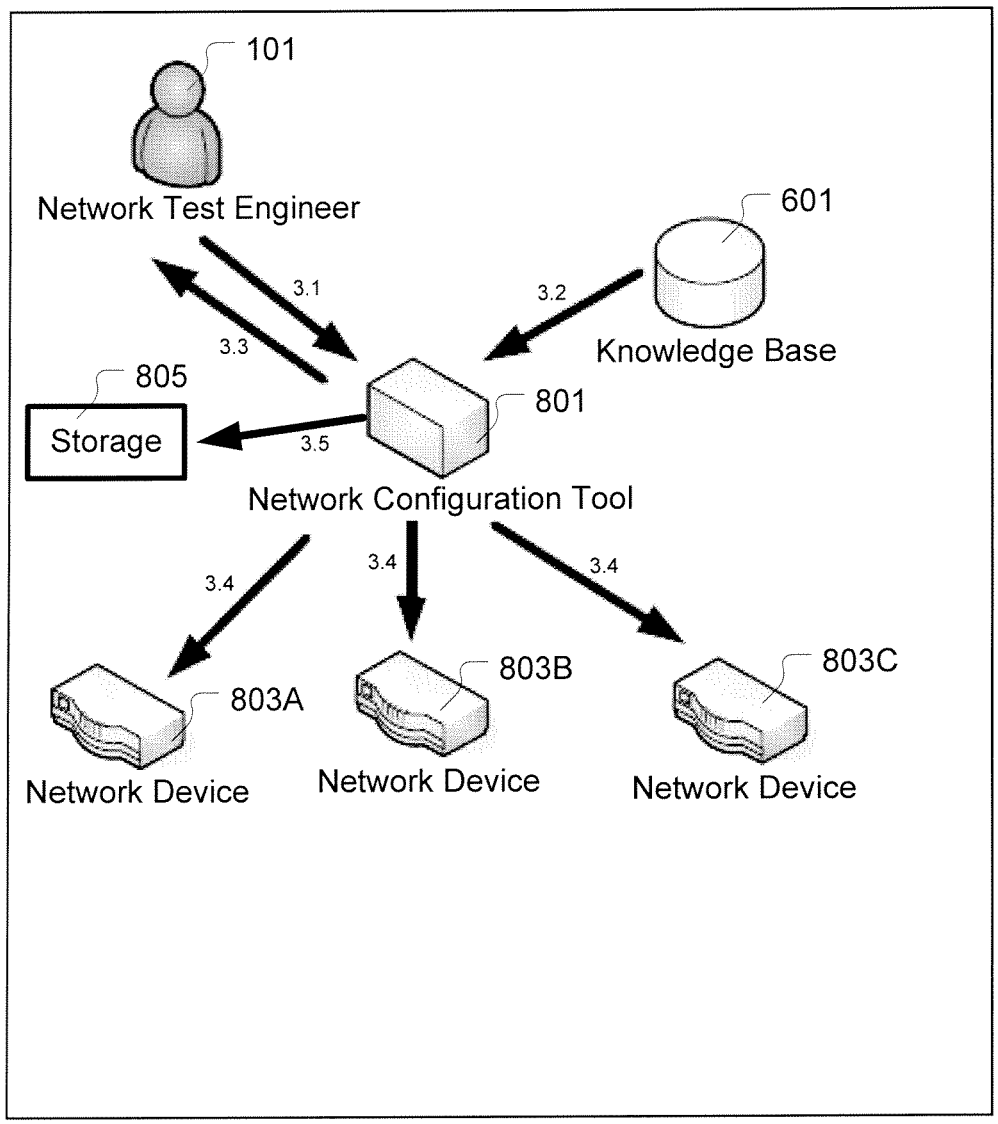
FIG. 8 is an illustration showing the interactions present in performing the device configuration process described in the method of FIG. 7, in accordance with one embodiment of the present invention.

FIG. 8 is an illustration showing the interactions present in performing the operations 701 through 711 of the method of FIG. 7, in accordance with one embodiment of the present invention. The network configuration tool 801 is defined to receive input from the network engineer 101, as indicated by arrow (3.1). For example, in performing operation 703, the network engineer 101 will provide the settings and goals for the network devices 803A, 803B, and 803C to the network configuration tool 801. Also, the network configuration tool 801 is defined to provide feedback to the network engineer 101, as indicated by arrow (3.3). For example, in performing operation 705, the network configuration tool 801 will provide to the network engineer 101 the predicted network device performance data for each defined input queue.

Additionally, in performing operation 705, the network configuration tool 801 will access the knowledge database 601, as indicated by arrow (3.2). According to operation 705, once the network device configuration is selected, the configuration data can be stored in the persistent storage device 805, as indicated by arrow (3.5). Also, according to operation 711, the selected network device configuration data can be used to configure each of the network devices 803A, 803B, and 803C, as indicated by arrows (3.4). Although the example of FIG. 8 indicates configuration of three network devices 803A, 803B, and 803C, it should be appreciated that the method of FIG. 7 is not limited to use in configuring a specific number of network devices. More specifically, the method of FIG. 7 can be implemented to configure one or more network devices in either a parallel or serial manner.

Figure 9:
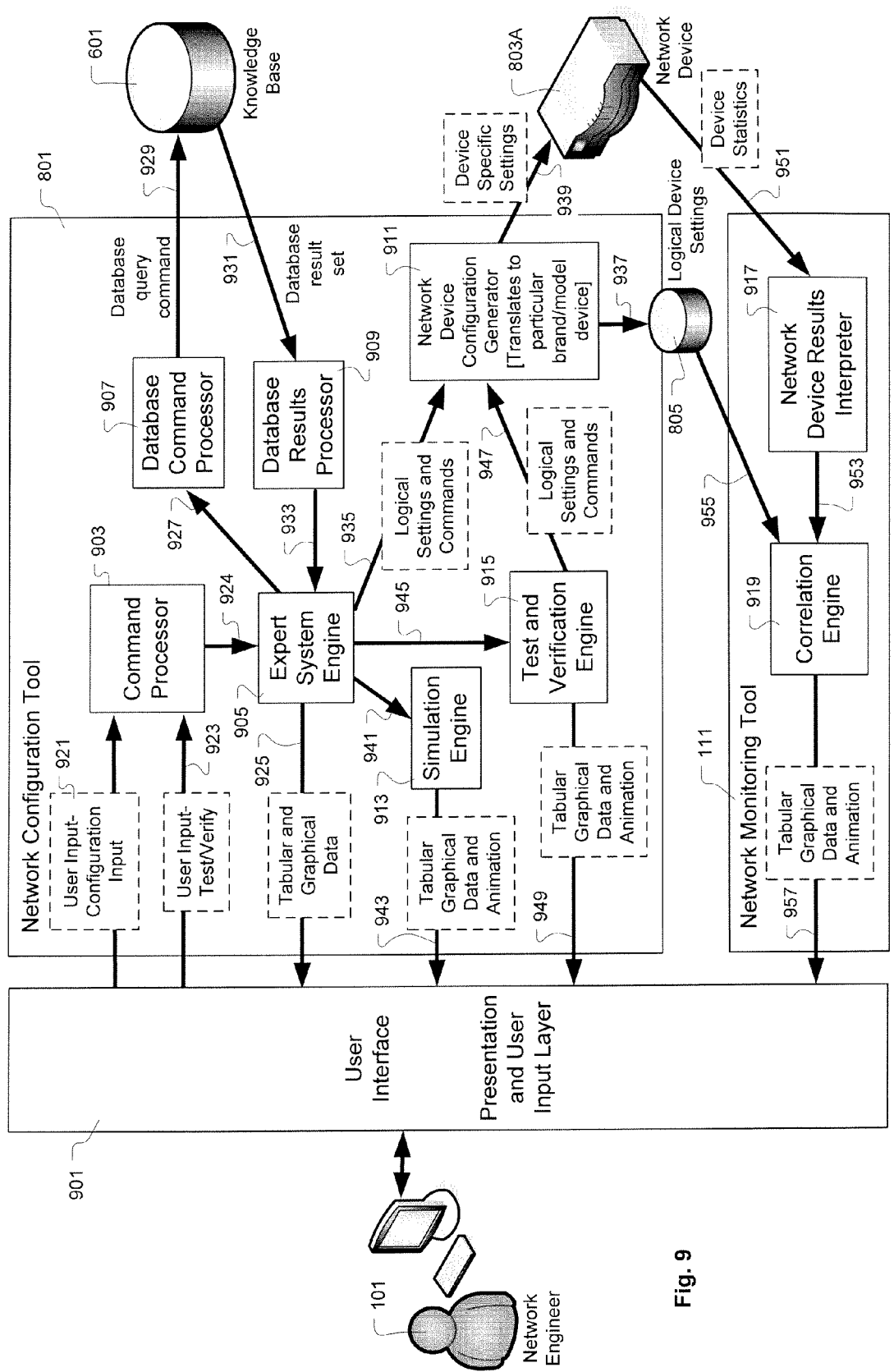
FIG. 9 is an illustration showing a logical representation of the network configuration tool and the network monitoring tool, as implemented in performing the method of FIG. 7, in accordance with one embodiment of the present invention.

FIG. 9 is an illustration showing a logical representation of the network configuration tool 801 and the network monitoring tool 111, as implemented in performing the method of FIG. 7, in accordance with one embodiment of the present invention. The network engineer 101 is capable of interfacing with the network configuration tool 801 and the network monitoring tool 111 through a user interface 901. The network configuration tool 801 includes a command processor module 903 defined to receive user input for selecting the settings and goals for the network device to be configured, as indicated by arrow 921. The command processor is also defined to receive user input for initiating the verification and testing of the configured network device, as indicated by arrow 923. Depending of the received user input, the command processor 903 communicates instructions to a system engine module 905, as indicated by arrow 924. The system engine module 905 operates to echo the user input back to the user through the user interface 901, as indicated by arrow 925.

The system engine module 905 also functions to process the user-specified settings and goals for the network device 803A into one or more formats that can be correlated with the content of the knowledge database 601. The system engine module 905 then determines the type of information that should be retrieved from the knowledge database to address each of the user-specified setting and goals for the network device 803A. Based on the type of information that should be retrieved from the knowledge database, the system engine module 905 formulates appropriate database access requests and communicates the database access requests to a database command processor module 907, as indicated by arrow. The database command processor module 907 converts the received database access requests into corresponding database query commands and queries the knowledge database 601, as indicated by arrow 929.

Query results generated by database query commands are transmitted from the knowledge database 601 to a database results processor module 909, as indicated by arrow 931. The database results processor module 909 functions to place the query results into a format that is suitable for communication to the system engine module 905, as indicated by arrow 933. Once the system engine module 905 receives the query results from the knowledge database 601, the system engine module 905 determines which network device configuration settings are optimal for satisfying the user-specified setting and goals. Then the optimal configuration settings are communicated to a network device configuration generator 911 module, as indicated by arrow 935. The network device configuration generator 911 module functions to translate the optimal configuration settings to a particular brand/model of the network device 803A being configured based on the syntax and command structure that is understood by the particular network device 803A. The translated configuration settings generated by the network device configuration generator 911 can be stored in persistent storage 805, as indicated by arrow, or can be used to configure the network device 803A, as indicated by arrow 939.

The system engine module 905 is also capable of directing a simulation engine module 913 to perform a simulation of the network device 803A performance based on the network device configuration settings that are determined to be optimal for satisfying the user-specified setting and goals, as indicated by arrow 941. In one embodiment, the simulation engine module 913 will use test results stored in the knowledge database 601 to simulate the performance of the network device 803A. The simulation engine module 913 is further defined to communicate the simulation results to the network engineer 101 through the user interface 901, as indicated by arrow 943.

The system engine module 905 is also capable of directing a test and verification engine 915 to perform verification and testing of the network device 803A, as indicated by arrow 945. In a manner consistent with the previously described method of FIG. 7, the test and verification engine 915 is defined to communicate logical settings and commands to the network device configuration generator module 911, as indicated by arrow 947, wherein the logical settings and commands may include instructions for generating and transmitting appropriate test traffic through the network device 803A. The network device configuration generator module 911 functions to translate the settings/command received from the test and verification engine module 915 to the particular brand/model of the network device 803A being tested based on the syntax and command structure that is understood by the particular network device 803A. Then, the test settings/commands are transmitted from the network device configuration generator module 911 to the network device 803A, as indicated by arrow 939. The test and verification engine module 915 also operates to echo the test settings/commands back to the user through the user interface 901, as indicated by arrow 949. In another embodiment, to perform verification, it may be an option to communicate to 803B or 803C to help generate traffic into 803A.

During verification and testing, statistical data regarding the internal operations of the network device 803A are communicated from the network device 803A to a network device results interpreter module 917 within the network monitoring tool 111, as indicated by arrow 951. The network device results interpreter module 917 functions to process the statistical data received from the network device 803A into a form that can be correlated to the configuration settings of the network device 803A. The processed statistical data is then communicated from the network device results interpreter module 917 to a correlation engine 919, as indicated by arrow. The correlation engine 919 is capable of accessing the configuration settings of the network device 803A stored on the persistent storage device 805, as indicated by arrow 955. The correlation engine 919 functions to evaluate the performance of the network device 803A as represented by the statistical data to the expected performance of the device as defined by the configuration settings. Based on the actual-to-expected network device performance evaluation results, the correlation engine 919 is capable of determining whether the network device 803A performance is acceptable. The correlation engine 919 is further defined to convey the processed statistical data and performance evaluation results to the network engineer 101 through the user interface 901, as indicated by arrow 957.

Figure 10:
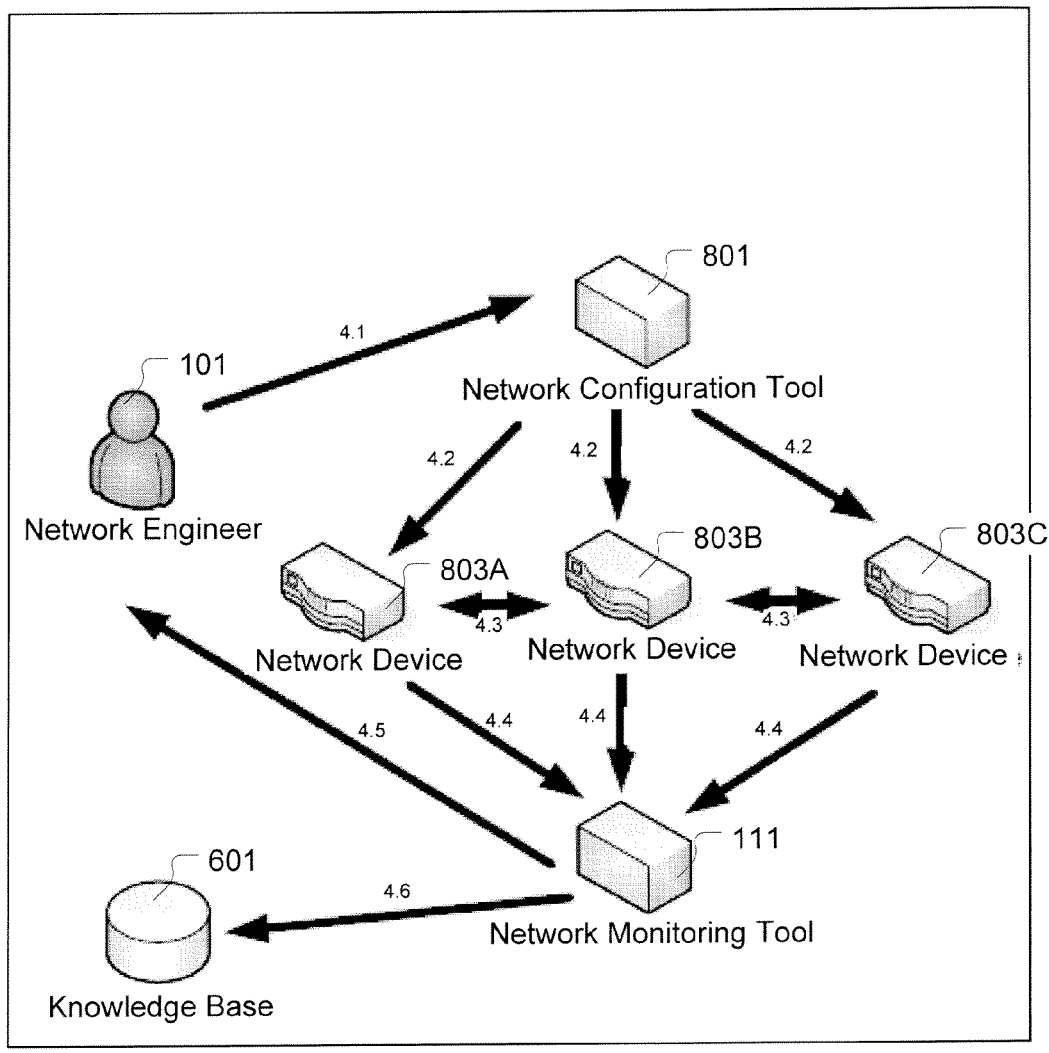
FIG. 10 is an illustration showing the interactions present in performing the testing/verification process described in the method of FIG. 7, in accordance with one embodiment of the present invention.

FIG. 10 is an illustration showing the interactions present in performing the testing/verification process described in operations 713 through 721 of the method of FIG. 7, in accordance with one embodiment of the present invention. The network engineer 101 initiates the testing and verification process by communicating appropriate commands to the network configuration tool 801, as indicated by arrow (4.1). As indicated by arrows (4.2), the network configuration tool 801 functions to program the network devices 803A, 803B, and 803C to generate test traffic to validate operations of one or more of the configured network devices 803A, 803B, and 803C. Although the example of FIG. 10 indicates the presence of three network devices 803A, 803B, and 803C, it should be appreciated that the testing and verification process can be performed using any number of network devices. For example, the testing can be performed by transmitting normal network traffic through one network device.

As the test traffic is transmitted through the one or more network devices (803A, 803B, 803C), the network monitoring tool 111 retrieves measurement data, i.e., statistical performance data, from the one or more network devices, as indicated by arrows (4.4). The network monitoring tool 111 functions to display the resulting measurement data and expected behavior of the one or more network devices (803A, 803B, 803C) to the network engineer 101, as indicated by arrow (4.5). Additionally, an optional operation can be performed to store the resulting measurement data and expected behavior of the one or more network devices (803A, 803B, 803C) in the knowledge database 601, as indicated by arrow (4.6), to further expand the depth of performance data characterized by the knowledge database 601.

Figure 11:
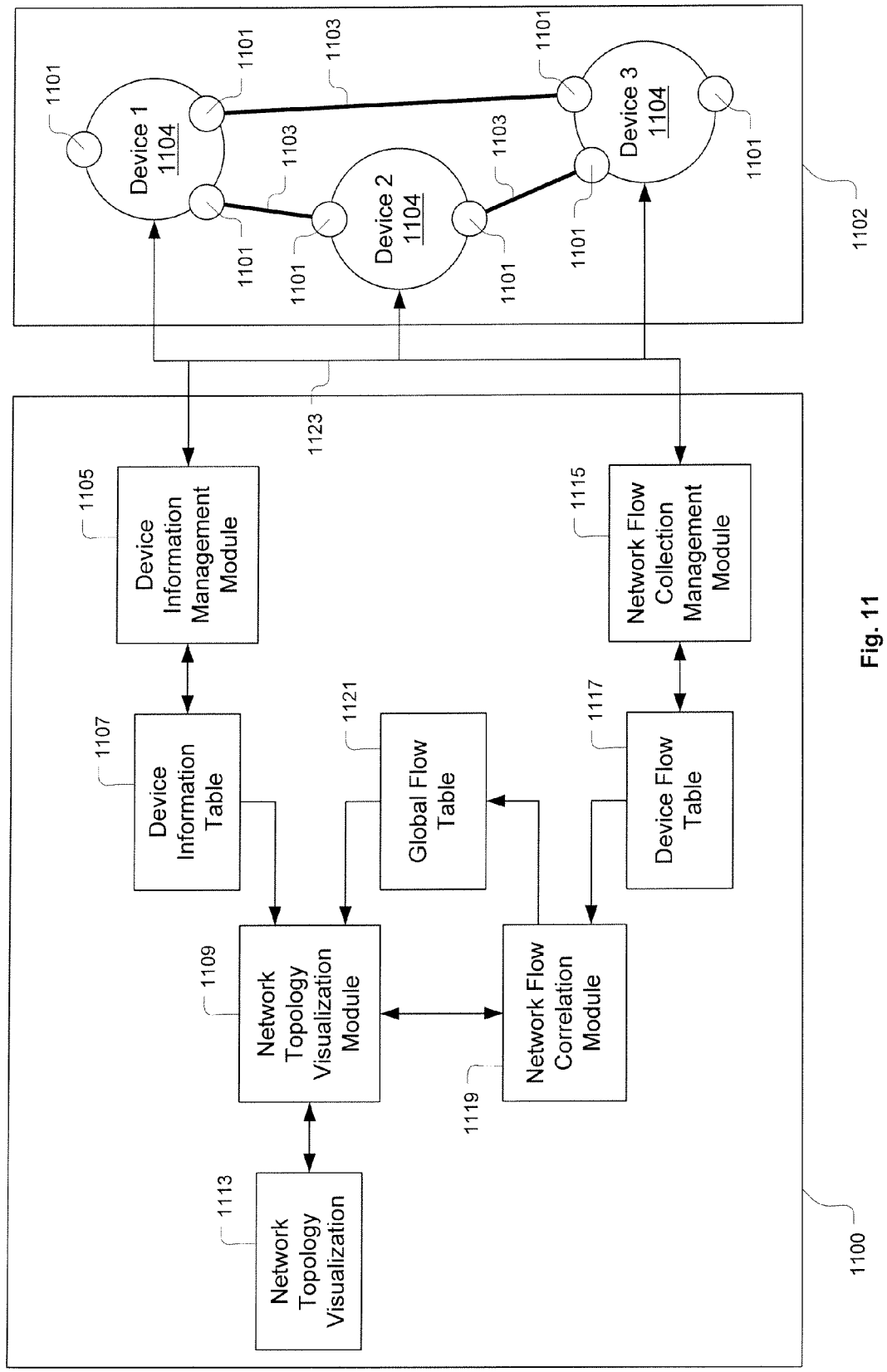
FIG. 11 shows a system for visualizing a network topology and network flows over the network topology, in accordance with one embodiment of the present invention.

FIG. 11 shows a system 1100 for visualizing a network topology and network flows over the network topology, in accordance with one embodiment of the present invention. In the system 100, network flow records are acquired and assembled in a network topology based view to create network flow visualization over the network topology. For purposes of description, an example network 1102 is shown to include network devices 1104 and their corresponding interfaces 1101. It should be understood that the configuration of the network 1102 in FIG. 11 is provided by way of example, and in no way represents any type of limitation on the network configuration to which the system 1100 can be applied. It should be understood that the system 1100 can be applied to essentially any type and configuration of network.

A network topology includes the network devices 1104, interfaces 1101 of the network devices 1104, and links 1103 between the various interfaces 1101. The system 1100 is defined to provide network flow visualization across the network topology as a layered view at the system level and inside the device level. The system level view is a network topology based view including one or more network devices and their interfaces connected together based on network connections. The device level view is a network flow view inside of a given device showing ingress and egress of network flows and how network flows are routed/switched within the given device.

The system 1100 is defined to communicate with the various network devices 1104, as indicated by arrows 1123. In various embodiments, this communication can be conducted over wired links, wireless links, or a combination thereof. The system 1100 includes a device information management module 1105 that is defined to acquire device configuration data from the devices 1104 within the network 1102. The device configuration data acquired from a given device 1104 provides for understanding of major logical and physical interfaces on the given device 1104. The various network devices 1104 can include routers, switches, network appliances (that are network flow capable), security appliances, and any other network device that can allow applications to read or receive network flow information.

Figure 12:
FIG. 12 shows an example device information table that may be generated by the device information management module, in accordance with one embodiment of the present invention.

The device information management module 1105 is defined to generate a device information table 1107 that includes relevant information for the various devices 1104 within the network 1102. FIG. 12 shows an example device information table 1107 that may be generated by the device information management module 1105, in accordance with one embodiment of the present invention. The example device information table 1107 includes an identification of each interface 1101 within each device 1104. For each identified interface 1101, the example device information table 1107 also includes a name, a type, an address, and a subnet mask. It should be understood, however, that the particular information included in the device information table 1107 can vary in different embodiments, so long as the various network devices 1104 and their interfaces 1101 through which network flows travel can be uniquely identified.

The system 1100 also includes a network visualization module 1109 defined to analyze the acquired device configuration data as compiled in the device information table 1107 to identify the interfaces 1101 of each network device 1104 and the subnets to which the interfaces 1101 connect. The network visualization module 1109 operates to create a network topology by reading the configuration of each network device 1104, and by determining the physical and logical interfaces 1101 that exist, the subnets to which these interfaces 1101 interface, and the addresses of these interfaces 1101. The network visualization module 1109 is further defined to render in a visual display of a computer system, a network topology visualization 1113 that includes a topology view of the network 1102, including graphical representations of the devices 1104, the interfaces 1101 within the devices 1101, and various connections between the interfaces 1101 and subnets. Logical interfaces such as router loopback, null interface, local interface, VLAN interface, tunnels, etc., are also depicted in the network topology visualization 1113. For tunnels, the logical connection across the system to the far end-point is depicted as well as the tunnel's associated physical interface within the router.

Figure 13:
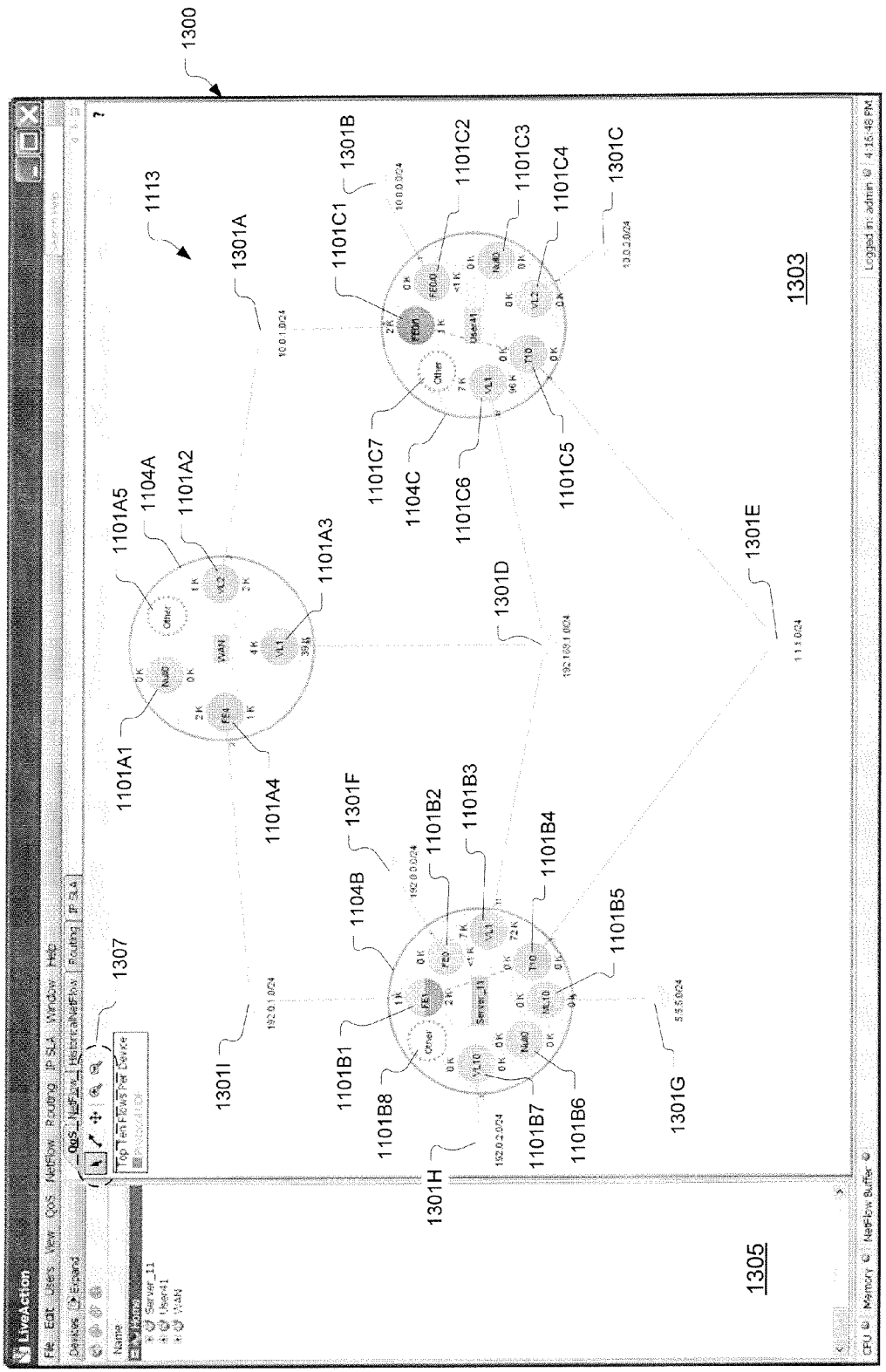
FIG. 13 shows an example network topology visualization within a graphical user interface (GUI) of the system, in accordance with one embodiment of the present invention.

FIG. 13 shows an example network topology visualization 1113 within a graphical user interface (GUI) 1300 of the system. 1100, in accordance with one embodiment of the present invention. Generation and operation of the GUI 1300 is provided by the network visualization module 1109. The GUI 1300 includes a first display region 1303 within which the network topology visualization 1113 is visually rendered. Network devices 1104A-1104C are shown as large circles.

Interfaces within the devices 1104A-1104C are shown as small circles. For example, the device 1104A is shown to include interfaces 1101A1-1101A5, the device 1104B is shown to include interfaces 1101B1-1101B8, and the device 1104C is shown to include interfaces 1101C1-1101C7.

Each network device 1104A-1104C and each interface therein 1101A1-1101A5, 1101B1-1101B8, 1101C1-1101C7 is labeled. Also, subnets 1301A-1301I to which the various network devices 1104A-1104C are connected are depicted within the network topology visualization 1113. Line segments indicating network connections are drawn between the various subnets 1301A-1301I and the interfaces of the devices 1104A-1104B to which they are connected. In one embodiment, values are displayed above and below each interface 1101A1-1101A5, 1101B1-1101B8, 1101C1-1101C7 to indicate the interface's input and output bandwidths, respectively.

The GUI 1300 also includes a second display region 1305 within which an interactive hierarchical view of the network 1102 is displayed. The interactive hierarchical view shows each device 1104A-1104C and its interfaces 1101A1-1101A5, 1101B1-1101B8, 1101C1-1101C7 within the network 1102. Selection within the hierarchical view of a particular device 1104A-1104C or a particular interface therein, will cause the view in the first display region 1303 to zoom into the selected device. The GUI 1300 also includes a number of controls 1307 for navigating around the network topology visualization 1113 shown in the first display region 1303. These controls 1307 can include a selection control, a network flow toggle control, a pan control, a zoom out control, and/or a zoom in control, among others.

With reference back to FIG. 11, the system 1100 also includes a network flow collection management module 1115 defined to acquire network flow records from each device 1104 within the network 1102. The network flow records acquired from a given network device 1104 indicates the ingress and egress interfaces for network flows through the given network device 1104. As used herein, a network flow record corresponds to a record of network traffic flow information stored within a network device. For example, a network flow record may be generated for each packet of network traffic that is forwarded within a router or switch. The content of the network flow record can include the IP source address, the IP destination address, the source port, the destination port, the ToS byte value, the ingress interface identifier, the egress interface identifier, the packet size in bytes, among other items of information concerning transmission of packets through a network.

Network flow records are stored within one of a number of formats within a given network device, depending on the type/manufacturer of the given network device. For example, Cisco and some other network device manufacturers generate and store network flow records within their devices in accordance with a structured format known as NetFlow. Other devices may use a network flow record format known as sFlow, which is a networking community standard that is similar to NetFlow except that it is based on sampled network flow information. Still other network devices may use a network flow record format known as IPFIX (IP Flow Information Export), which is an open standard specification for exchanging IP traffic flow information. IPFIX is very similar to NetFlow but is supported by the IETF. Also, network devices manufactured by Juniper Networks, Inc., may use a network flow record format known as J-Flow. It should be understood that the network flow collection management module 1115 of the system 1100 is defined to understand each network flow record format utilized by the various devices 1104 of the network 1102, such that accurate network flow records can be acquired from each device 1104 within the network 1102. Additionally, as new or modified network flow record formats are deployed, the network flow collection management module 1115 can be updated accordingly.

Figure 14:
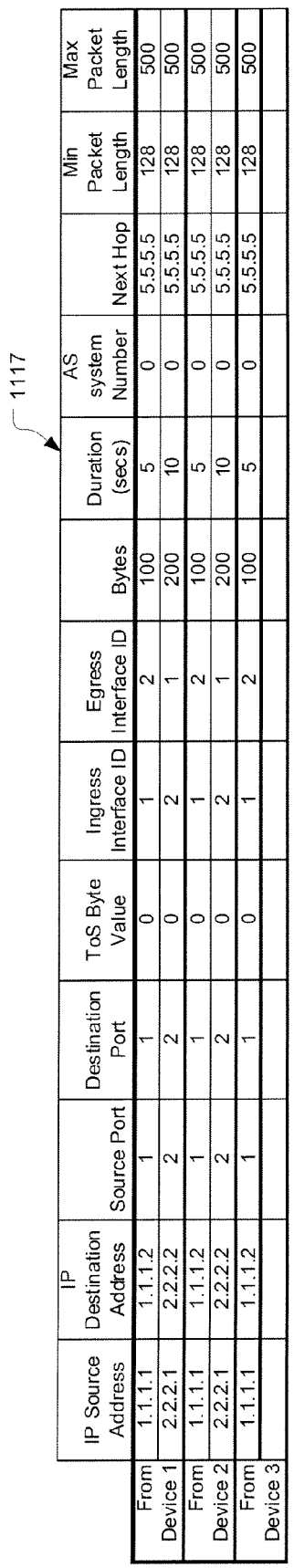
FIG. 14 shows an example device flow table, in accordance with one embodiment of the present invention.

The network flow collection management module 1115 is defined to generate a device flow table 1117 that includes data for network flow records acquired from the various network devices 1104. FIG. 14 shows an example device flow table 1117, in accordance with one embodiment of the present invention. In some instances, information for a given network flow through a device is separated into two records: 1) a first record for how the network flow entered the device, and 2) a second record for how the network flow exited the device. If the network flow is separated into two records as such, then the two records can be merged into one for subsequent visualization. Using the network flow information on specific ingress and egress interfaces of a given device, switching of the network flow within the given device can be visualized.

The system 1100 further includes a network flow correlation module 1119 define to correlate separate network flow records acquired from different network devices, as stored in the device flow table 1117, together into a common network flow record, where the separate network flow records share a common source address and a common destination address. Thus, the common network flow record generated by the correlation module 1119 specifies transmission path segments of a single communication through the network. The correlation module 1119 generates a global flow table 1121 that stores data for the common network flows.

The correlation module 1119 processes the network flow records acquired from the various network devices 1104 to identify and correlate network traffic that is identical based on key fields found in the network flow records. Typical key fields used to identify and correlate network traffic are source IP address, destination IP address, source port number, destination port number, and IP header DSCP marking. When the values in the above-mentioned key fields of the network flow records match, the network flow records are identified as being part of the same network communication.

Figure 15:
FIG. 15 shows an example global flow table based on the example device flow table of FIG. 14, in accordance with one embodiment of the present invention.

FIG. 15 shows an example global flow table 1121 based on the example device flow table 1117 of FIG. 14, in accordance with one embodiment of the present invention. It should be understood that in various embodiments, the global flow table 1121 may include more or less information than what is shown in FIG. 15, so long as sufficient information is stored in the global flow table 1121 to enable reproduction of how various network communications traverse between devices and their interfaces within the network.

Network flow records indicate the ingress and egress interface of the network flow within each device. Using this ingress and egress interface data, portions of a given network flow can be stitched together to resemble one continuous network flow across the network, indicating where the network flow enters and exits each network device and associated interface across the network.

The network visualization module 1109 is defined to render each common network communication flow over the topology view in the first display region 1303 of the GUI 1300 by displaying an arrow for each transmission path segment traversed by the common network communication through the network. When multiple common network communication flows are simultaneously rendered, separate ones of the multiple common network communication flows can be respectively depicted by arrows of common characteristic, e.g., common color.

Figure 16A:
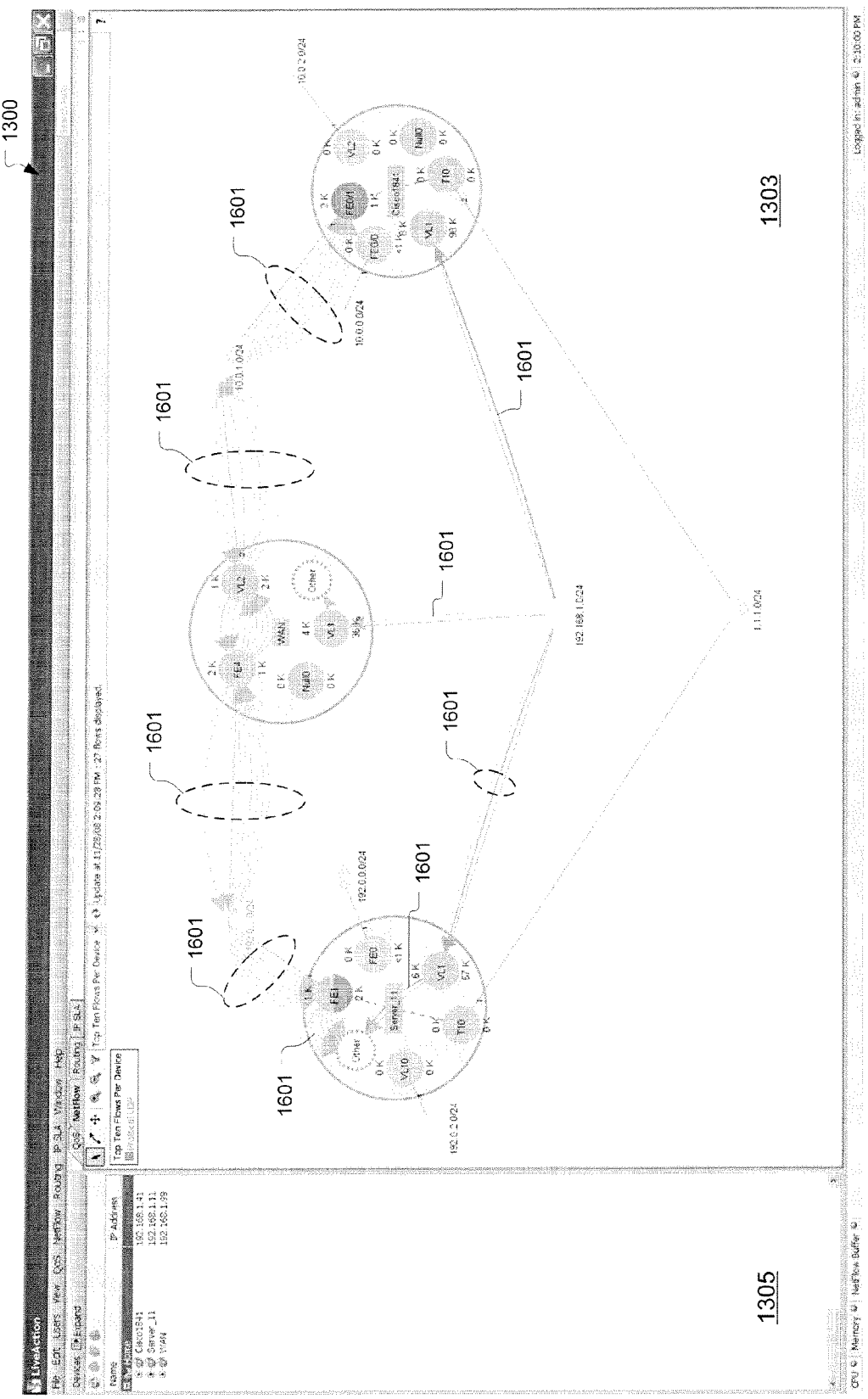
FIG. 16A shows an example of the GUI depicting common network communication flows over the topology view in the first display region, in accordance with one embodiment of the present invention.

FIG. 16A shows an example of the GUI 1300 depicting common network communication flows over the topology view in the first display region 1303, in accordance with one embodiment of the present invention. The network flows are visualized by showing the source and destination address as the endpoints and by drawing a number of arrows 1601 extending through the network between the source and destination addresses. More specifically, an arrow is drawn from a source address to a subnet cloud. Then, an arrow is drawn from the subnet cloud to an ingress interface of a network device. Then, an arrow is drawn through the network device from the ingress interface to an egress interface. Then, if necessary, additional arrows are drawn to another subnet cloud, and on to another network device, and through the other network device, etc. Ultimately, an arrow is drawn from a network device to the destination address. Some network flows will get terminated within a router to which it is destined or within which it is blocked. These network flows will show their termination point within the local or null interface within the router.

The key fields used to identify and correlate network flow records within the global flow table 1121 can be selected to aggregate and display network flows in various ways. For example, selection of source IP address and destination IP address as the key fields, directs the network visualization module 1109 to aggregate network flow records that share common source and destination IP addresses. Essentially any type of network flow aggregation or parsing can be done through particular selections of key fields in the network flow records of the global flow table 1121.

It should be understood that the system 1100 is defined to acquire network flow records from the various network devices 1104, process the acquired network flow records through the network flow correlation module 1119, and render the corresponding aggregated network communication flows within the GUI 1300 in essentially real-time. In one embodiment, network flow visualization is created based on network flow records that are polled, rather than scheduled, so as to get more accurate real-time visualization of what is happening in the network 1102.

Correlation of network flows from device-to-device requires some storage of network flow data, as the arrival of network flow data at the correlation module 1119 from different devices can vary in time, depending on the techniques used to gather the network flow data. Also, caching of network flow data may be required to prevent premature loss of the network flow data before it can be visually rendered in the GUI 1300. For example, some devices send the network flow data when the network flow has actually terminated. In this case, the correlation engine may need to cache the network flow data. Also, in one embodiment, cached network flow data can be allowed to expire (and be deleted) after a specified period of time.

Figure 16B:
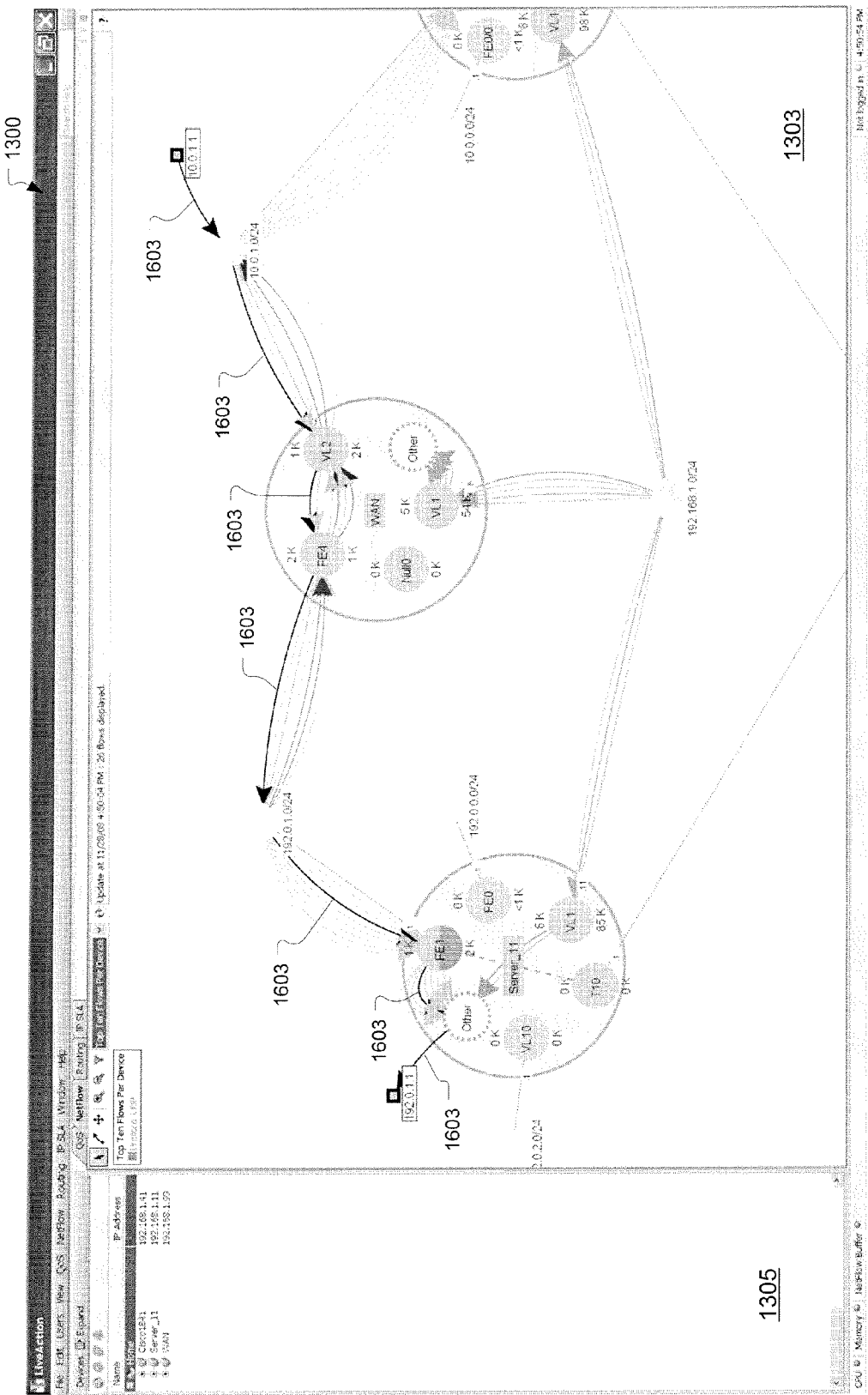
FIG. 16B shows an example of how a particular network communication flow can be selected and identified within the GUI, in accordance with one embodiment of the present invention.

The GUI 1300 and underlying network visualization module 1109 is defined to enable visual exploration and analysis of the acquired and processed network flow data. FIG. 16B shows an example of how a particular network communication flow can be selected and identified within the GUI 1300, in accordance with one embodiment of the present invention. Specifically, the darker arrows 1603 correspond to the selected network communication flow that originated at source IP address 10.0.1.1 and terminated at destination IP address 192.0.1.1. In one embodiment, selection of a particular network communication flow can be done by way of a user input device such as a mouse. In another embodiment, selection of a particular network communication flow can be made from a listing of the displayed network communication flows.

Figure 16C:
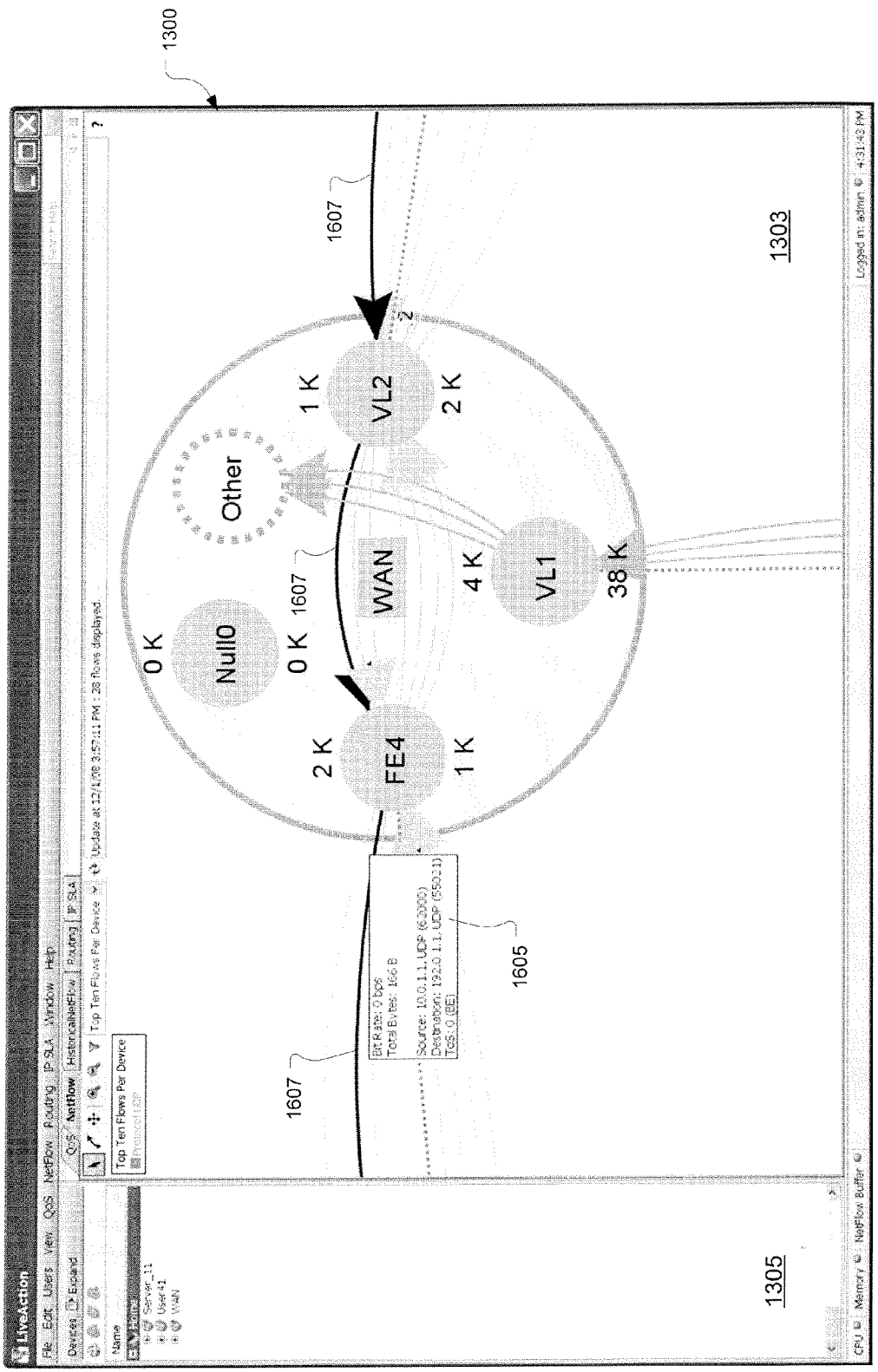
FIG. 16C shows an example of how the GUI can be operated to zoom in on a particular network device, in accordance with one embodiment of the present invention.
Figure 16D:
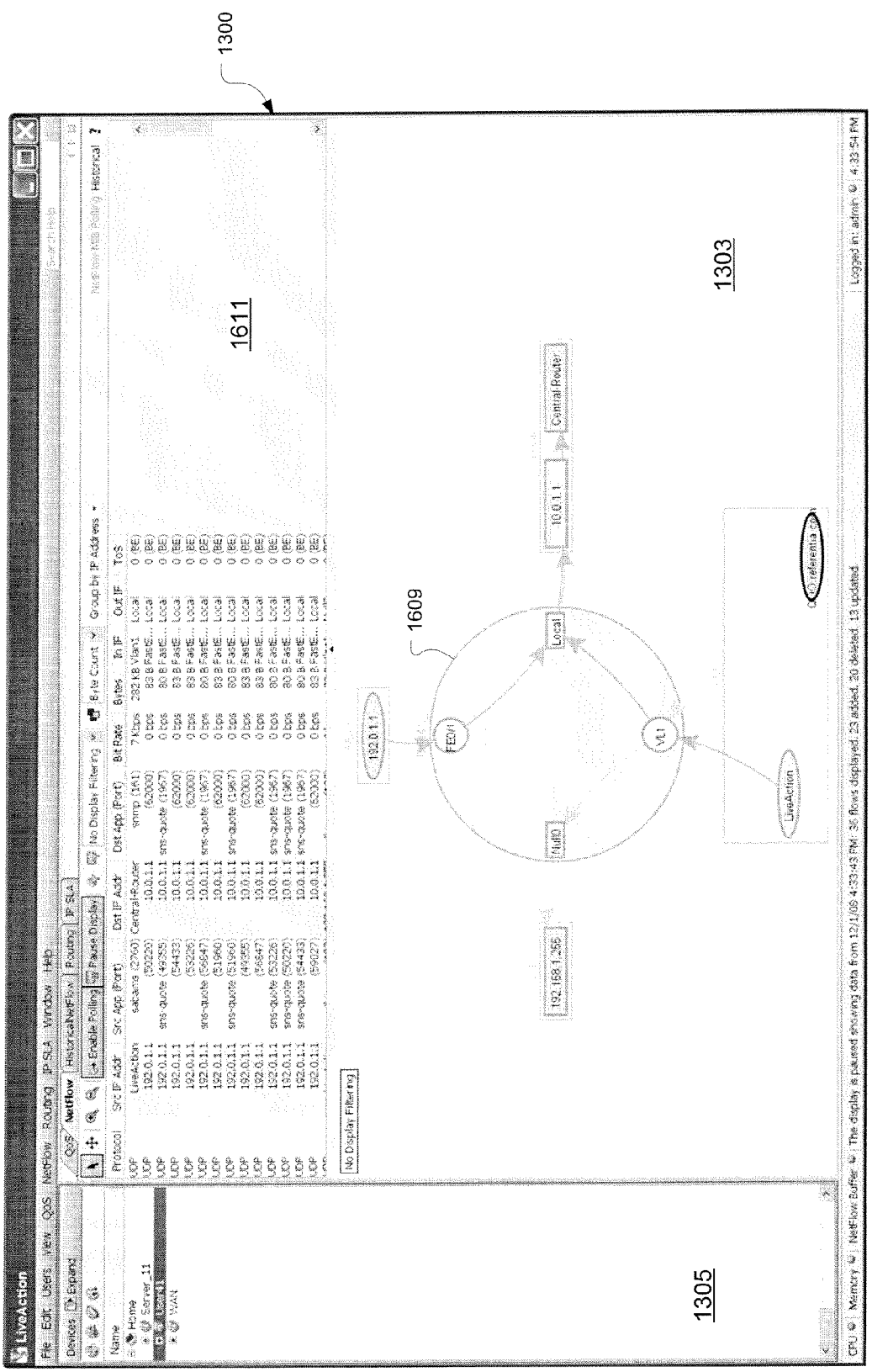
FIG. 16D shows an example of how the GUI can be operated to display a device level view of a particular network device, in accordance with one embodiment of the present invention.

FIG. 16C shows an example of how the GUI 1300 can be operated to zoom in on a particular network device, in accordance with one embodiment of the present invention. FIG. 16C also shows a feature of the GUI 1300 for displaying information 1605 about a particular selected network communication flow 1607. FIG. 16D shows an example of how the GUI 1300 can be operated to display a device level view of a particular network device 1609, in accordance with one embodiment of the present invention. A user can select the particular device 1609 within the hierarchical view of the network within the second display region 1305. An isolated view of the selected device 1609 is rendered in the first display region 1303 showing the device 1609 along with its interfaces and arrows representing the various network flows associated with the device 1609. The device level view also provides a tabular listing of data for the network flows associated with the device 1609 within a display region 1611.

Figure 17A:
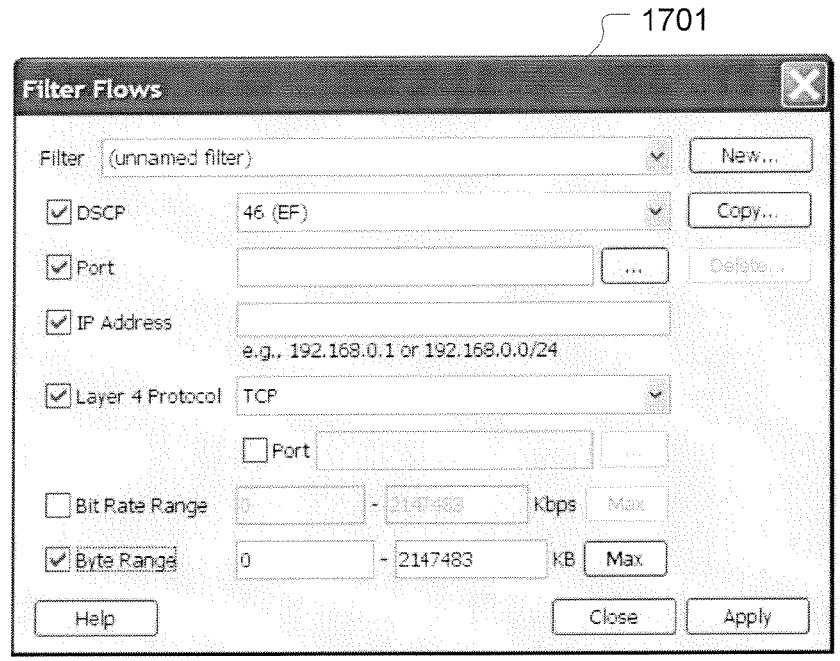
FIG. 17A shows a control GUI for defining, saving, and applying a network flow parameter filter, in accordance with one embodiment of the present invention.

The network visualization module 1109 provides for filtering of the displayed network flows based on various network flow parameters such as DSCP, port, IP address, layer 4 protocol, bit rate range, byte range, among others. FIG. 17A shows a control GUI 1701 for defining, saving, and applying a network flow parameter filter, in accordance with one embodiment of the present invention. The network visualization module 1109 also provides for customization of how the network topology and various network flows are shown in the GUI 1300.

Figure 17B:
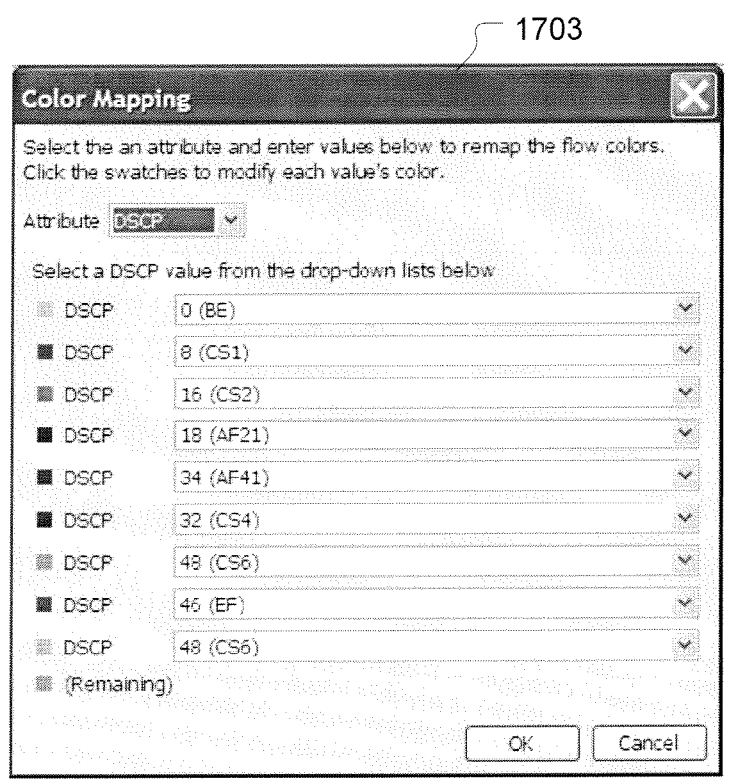
FIGS. 17B-17F show control GUIs for applying selected colors to particular network topology and flow parameter ranges to facilitate visual evaluation of the network and flows therein, in accordance with various embodiments of the present invention.
Figure 17C:
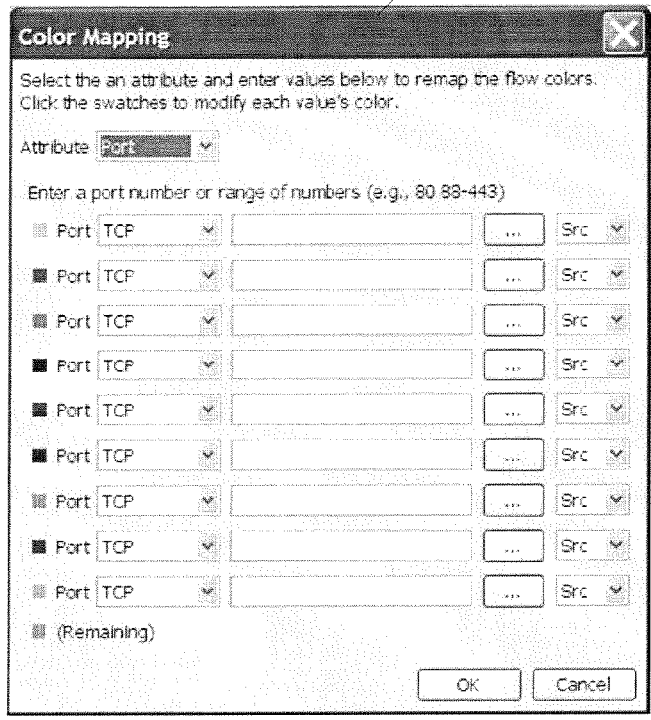
Figure 17D:
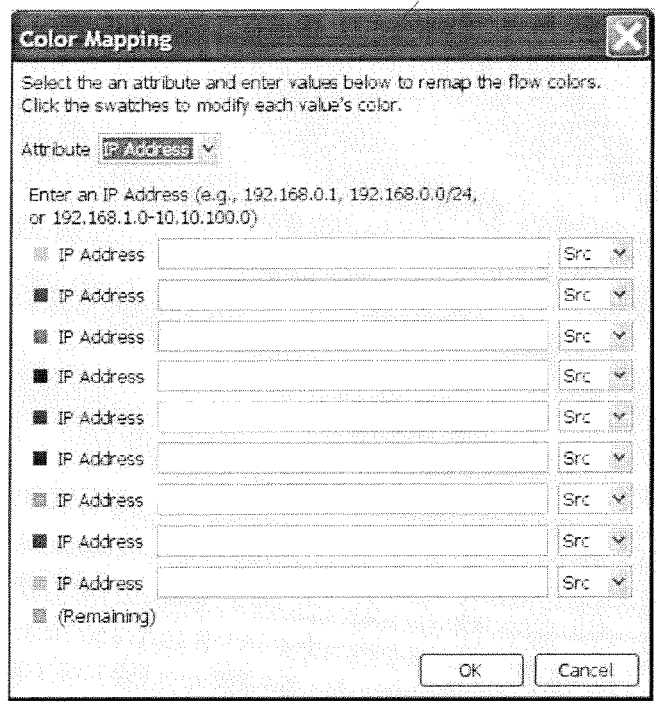
Figure 17E:
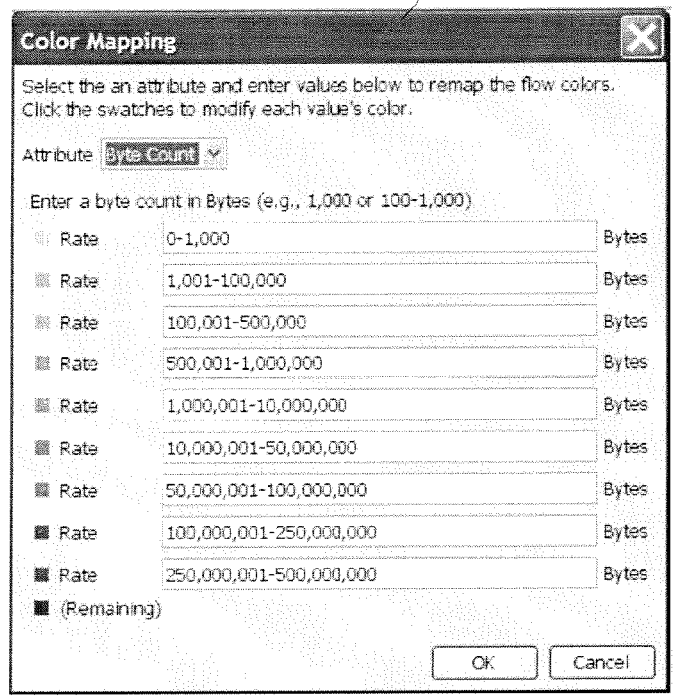
Figure 17F:
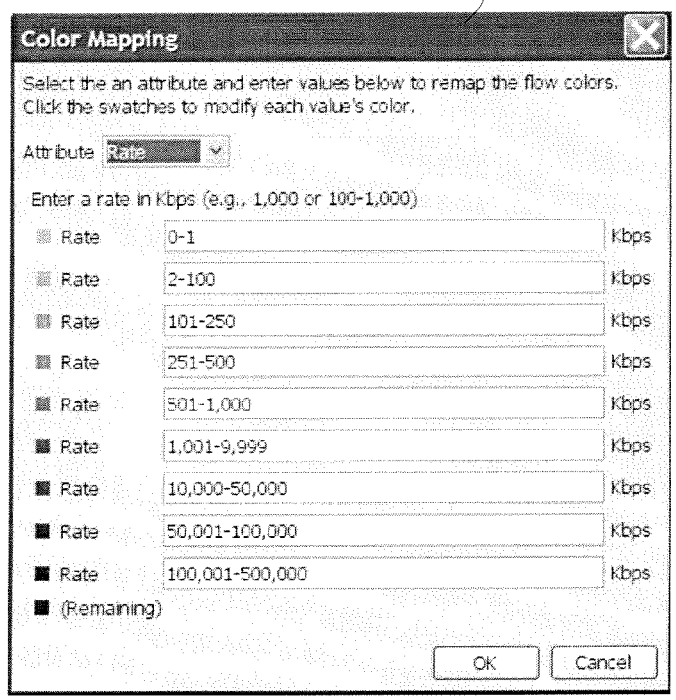

FIGS. 17B-17F show control GUIs for applying selected colors to particular network topology and flow parameter ranges to facilitate visual evaluation of the network and flows therein, in accordance with various embodiments of the present invention. FIG. 17B shows a color mapping control GUI 1703 for applying various colors to different ranges of the DSCP parameter. FIG. 17C shows a color mapping control GUI 1705 for applying various colors to different ranges of the port parameter. FIG. 17D shows a color mapping control GUI 1707 for applying various colors to different ranges of the IP address parameter. FIG. 17E shows a color mapping control GUI 1709 for applying various colors to different ranges of the byte count parameter. FIG. 17F shows a color mapping control GUI 1711 for applying various colors to different ranges of the rate parameter.

Network flow information that is gathered by the system 1100 over time can be stored in a database. This historical network flow information can be analyzed through various methods and data mining techniques. In one embodiment, historical displays can be generated within the GUI 1300 to show trending in a spatial manner within the network topology view. Network flow information can be used to show internal paths taken by a given flow inside routers, switches, and other network devices within the network topology view. In one embodiment, historical changes in network flows can be shown by binning network flow information into temporal bins. Also, historical network flows can be correlated across network devices using network flow keys. Once correlated, a given historical network flow can be visualized as a single flow across the network devices through which it traveled.

Historical network flow information can be sorted, filtered, grouped, and/or colored using various classification methods based on various information from different packet layers, including packet layers 2, 3, 4, etc. Also, in one embodiment, historical network flows for a particular time of interest can be rendered over the network topology view within the GUI 1300 by way of a slider control that allows selection of a particular time period. Additionally, an automatic playback feature is provided to enable animation of historical network flows over tune within the visual context of the network topology view.

It should be appreciated that the system 1100 for network topology and flow visualization provides many useful features. For example, the system 1100 includes a feature to enable creation of lists such that network addresses that match are displayed differently by color, name, etc. Also, the system 1100 provides for aggregation of network flows into categories. The system 1100 provides for display of network flow status, device status, and/or interface status by color and/or statistics. The system 1100 also provides various ways to filter, color, and/or search the network flow data for visualization within the GUI 1300. Additionally, the system 1100 provides for real-time information of network flows, such as bandwidth usage.

The system 1100 is also defined to visually display routing information on top of the network topology view within the GUI 1300. Routing information can be gathered by reading routing table entries directly from the various network devices. It should be appreciated that the routing table entries that are read may not be the same routing table entries that are advertised externally. This visualization feature may show route entries coming out of a given interface that the route entry would process packets toward.

The system 1100 is also defined to visually display artificial network traffic generation logical connections on top of the network topology view. Also, artificial network traffic generation, such as IPSLA (IP Service Level Agreement) statistics can be visually displayed on top of the network topology view within the GUI 1300. The system 1100 also provides for visual identification of layer 2 network flows within a VLAN by MAC or VLAN tag parameters, or other relevant parameters. The system. 1100 further provides for display of a virtualization of a VLAN on top of the network topology view within the GUI 1300, including identification of the VLAN port and device membership within the network.

Additionally, the network visualization module 1109 can be defined to generate ladder diagrams showing back and forth transaction of network flows for particular applications. This is accomplished by using the network flow data key fields in various ways. For example, in one embodiment, the key fields are set as the source IP address, destination. IP address, source port, destination port, and TCP flag field. In this embodiment, a new network flow would be created for each TCP flag change.

It should be understood that the system 1100 for network topology and flow visualization is particularly well-suited for use in conjunction with the method of FIG. 7 for optimally configuring a network work device by utilizing the knowledge database developed according to the method of FIG. 1. In particular, the system 1100 can be utilized to visually monitor and evaluate network flows through the DUT 205 analyzed in the test system 200, and/or through the network device installed in operation 701.

Figure 18:
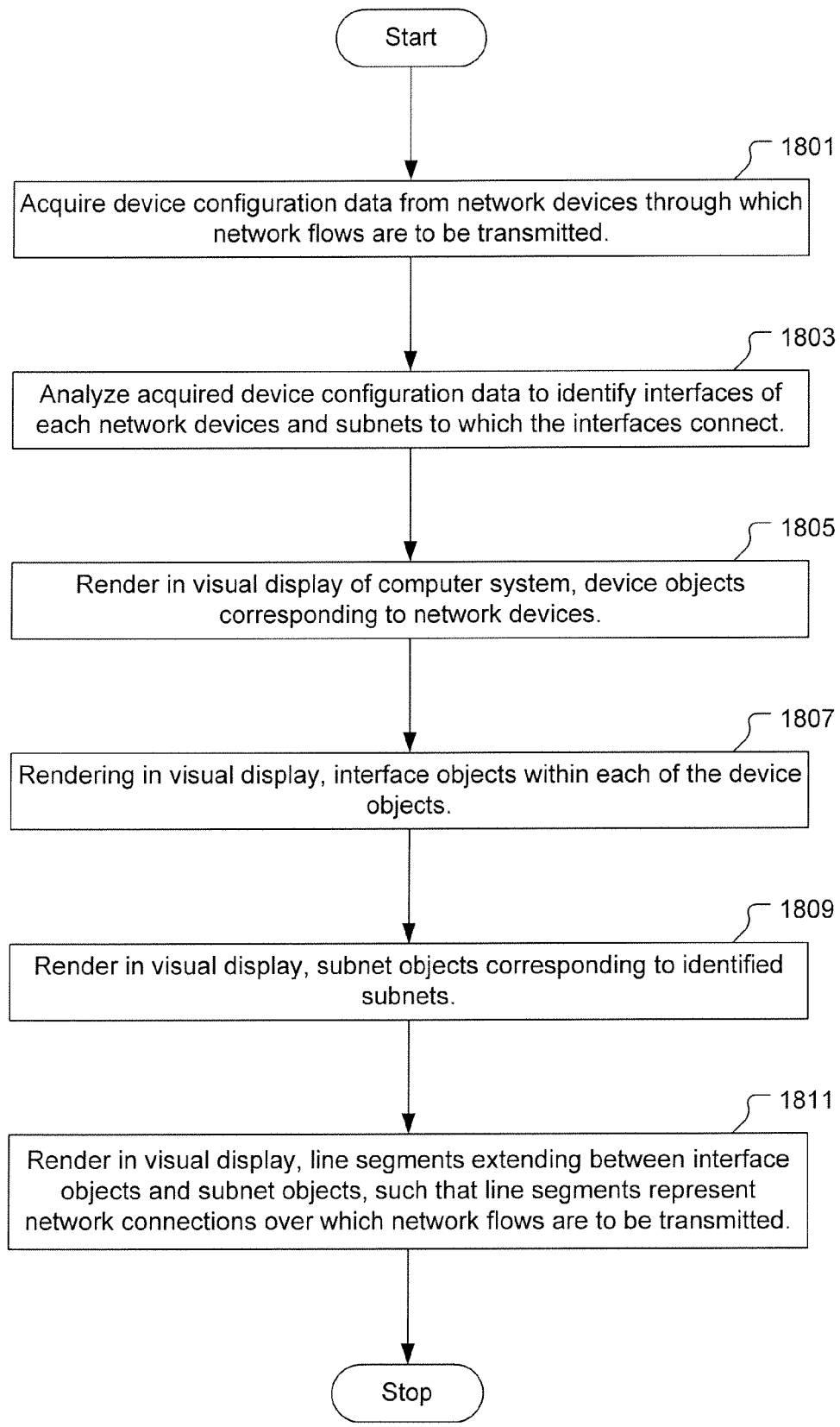
FIG. 18 shows a flowchart of a method for visualizing a network topology, in accordance with one embodiment of the present invention.

FIG. 18 shows a flowchart of a method for visualizing a network topology, in accordance with one embodiment of the present invention. The method includes an operation 1801 for acquiring device configuration data from a number of network devices through which network flows are to be transmitted. In one embodiment, a device information table is generated to include the acquired device configuration data, and the device information table is stored on a computer readable storage medium. The method also includes an operation 1803 for analyzing the acquired device configuration data to identify one or more interfaces of each of the number of network devices, and to identify subnets to which the one or more interfaces connect.

The method further includes an operation 1805 for rendering in a visual display of a computer system a number of device objects corresponding to the number of network devices. The method also includes an operation 1807 for rendering in the visual display a number of interface objects within each of the number of device objects. Each interface object represents a particular identified interface of the network device that corresponds to the rendered device object. In one embodiment, the operation 1805 includes displaying and labeling a large geometric shape for each device object. Also, in one embodiment, the operation 1807 includes displaying and labeling a small geometric shape for each interface object within the large geometric shape of its device object. In one embodiment, the small and large geometric shapes are depicted as small and large circles, respectively. The method can also include an operation for rendering a first value above each interface object indicating an input bandwidth of the interface object, and rendering a second value below each interface object indicating an output bandwidth of the interface object.

The method further includes an operation 1809 for rendering in the visual display a number of subnet objects corresponding to the identified subnets. An operation 1811 is also provided for rendering in the visual display line segments extending between interface objects and subnet objects. The line segments represent network connections over which network flows are to be transmitted. Additionally, in one embodiment, an operation is performed to render in the visual display a hierarchical view of the number of network devices and the interfaces within the number of network devices. Also in this embodiment, upon selection of a particular network device in the hierarchical view, an isolated view of the particular selected network device is rendered in the visual display.

Figure 19:
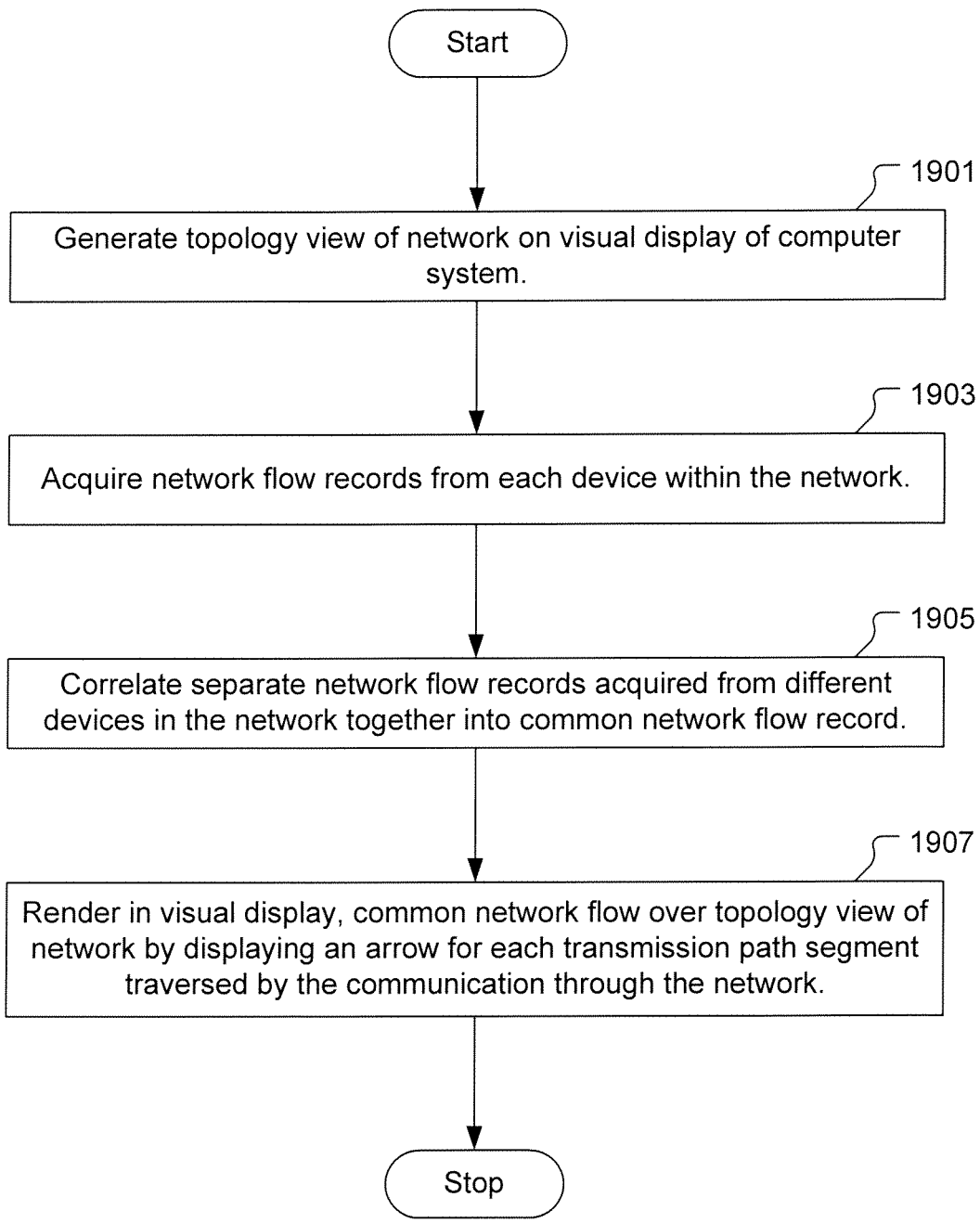
FIG. 19 shows a flowchart of a method for visualizing a network flow over a network topology, in accordance with one embodiment of the present invention.

FIG. 19 shows a flowchart of a method for visualizing a network flow over a network topology, in accordance with one embodiment of the present invention. The method includes an operation 1901 for generating a topology view of a network on a visual display of a computer system. The topology view includes subnet objects, network device objects, and interface objects within the network device objects. Generation of the topology view includes labeling each of the subnet objects, network device objects, and interface objects.

The method also includes an operation 1903 for acquiring network flow records from each device within the network. In one embodiment, the network flow records for each device correspond to communication packet data records. Each communication packet data record includes an IP source address, an IP destination address, a source port, and a destination port. The method further includes an operation 1905 for correlating separate network flow records acquired from different devices in the network together into a common network flow record. Each of the separate network flow records shares a common source address and a common destination address. Also, the common network flow record specifies transmission path segments of a communication through the network.

The method also includes an operation 1907 for rendering in the visual display the common network flow over the topology view of the network by displaying an arrow for each transmission path segment traversed by the communication through the network. Arrows for transmission path segments traversed by a given communication through the network are depicted in a like manner to indicate that the arrows are associated with the given communication. Arrows associated with different communications through the network are depicted differently to visually differentiate between the different communications. In one embodiment, the method also includes an operation for selecting an arrow for a given transmission path segment, and conspicuously modifying a visual display of all arrows associated with the communication through the network within which the given transmission path segment is included.

Based on the foregoing, it should be appreciated that the system 1100 for network topology and flow visualization provides advanced system level network flow visualization with detailed internal router and interface flow visualizations. By way of the system 1100, network engineers are able to quickly set up and view network flow information, e.g., NetFlow data, on their specific networks. The system 1100 provides a network topology view with live network flow activity displayed over the network topology view. By way of the network topology view, a user can quickly drill down to individual devices and/or interfaces to obtain corresponding detailed information. The network topology and flow views provided by the system 1100 enable quick and easy identification of trouble spots on the network, such as congested devices and/or interfaces. Additionally, the system 1100 enables clear visual observation of the results of applying different network and router settings, such as the effects of applying routing changes on network traffic and flows.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, DVDs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for network flow visualization, comprising:
 displaying a network topology in a graphical user interface on a display of a computer, the network topology including graphical representations of multiple network devices, of internal interfaces within the multiple network devices, and of network connections between the multiple network devices;
 acquiring a plurality of network flow records from each of the multiple network devices for a specified period of time,
 wherein each of the plurality of network flow records is generated by a corresponding one of the multiple network devices and is uniquely associated with the corresponding one of the multiple network devices and is stored by the corresponding one of the multiple network devices,
 wherein each of the plurality of network flow records includes information about a corresponding network flow through the corresponding one of the multiple network devices, and
 wherein each of the plurality of network flow records is generated and stored separate from data of the corresponding network flow, and
 wherein each of the plurality of network flow records includes data fields for
  1) an identifier of the ingress interface through which the corresponding network flow entered the corresponding one of the multiple network devices, and
  2) an identifier of an egress interface through which the corresponding network flow exited the corresponding one of the multiple network devices or an identifier of an internal interface at which the corresponding network flow terminated within the corresponding one of the multiple network devices, and
  3) an internet protocol source address for the corresponding network flow, and
  4) an internet protocol destination address for the corresponding network flow, and
  5) a source port for the corresponding network flow, and
  6) a destination port for the corresponding network flow;
 correlating separate ones of the plurality of network flow records based on content of the data fields so as to create a common network data communication flow record as a combination of the correlated separate ones of the plurality of network flow records for the specified period of time, wherein each of the separate ones of the plurality of network flow records within the common network data communication flow record has
1) identical content in the data field for the internet protocol source address for the corresponding network flow, and
2) identical content in the data field for the internet protocol destination address for the corresponding network flow, and
3) identical content in the data field for the source port for the corresponding network flow, and
4) identical content in the data field for the destination port for the corresponding network flow;

repeating the correlating of separate ones of the plurality of network flow records based on content of the data fields so as to create a plurality of common network data communication flow records for the specified period of time;

aggregating some of the plurality of common network data communication flow records based on identical content in one or more data fields of the plurality of common network data communication flow records to create an aggregated network communication flow record for the specified period of time; and rendering, on the display, an animation of a graphical representation of the aggregated network communication flow record for the specified period of time, wherein the animation of the graphical representation of the aggregated network communication flow record is rendered in lieu of rendering graphical representations of the plurality of common network data communication flow records represented by the aggregated network communication flow record, the animation of the graphical representation of the aggregated network communication flow record including one or more arrows to represent a data communication path traversed through the network topology by network flows represented by the aggregated network communication flow record, wherein the animation of the graphical representation of the aggregated network communication flow record includes at least one arrow depicting a segment of the data communication path traversed inside of at least one of the multiple network devices; and providing a control within the graphical user interface to control a temporal progression through the animation of the graphical representation of the aggregated network communication flow record, including pausing of the animation at a selected time within the specified period of time.

2. The method as recited in claim 1, wherein each of the plurality of network flow records identifies other internal interfaces within the corresponding one of the multiple network devices to which the corresponding network flow was transmitted.

3. The method as recited in claim 2, wherein the other internal interfaces includes a local interface at which the corresponding network flow was terminated within the corresponding one of the multiple network devices.

4. The method as recited in claim 1, wherein the multiple network devices includes a router, and wherein a given network flow record is generated for a packet of network traffic that is forwarded within the router.

5. The method as recited in claim 1, further comprising:
filtering the plurality of network flow records based on one or more network flow parameters to identify a filtered set of the plurality of network flow records; and
rendering, on the display, graphical representations of transmission paths of the filtered set of the plurality of network flow records.

6. The method as recited in claim 5, further comprising:
rendering, on the display, a control graphical user interface for defining, saving, and applying the filtering of the plurality of network flow records.

7. The method as recited in claim 6, wherein the one or more network flow parameters include one or more of a DSCP (Differentiated Services Code Point), port, IP (Internet Protocol) address, layer 4 protocol, bit rate range, byte range, VLAN (Virtual Local Area Network) tag parameter, MAC (Media Access Control) parameter, and TCP (Transmission Control Protocol) flag field.

8. The method as recited in claim 5, further comprising:
modifying an appearance of one or more of the graphical representations of the transmission paths of the filtered set of the plurality of network flow records based on network flow parameters.

9. The method as recited in claim 1, wherein each of the plurality of network flow records includes information about a corresponding layer 2 network flow.

10. The method as recited in claim 9, wherein the corresponding layer 2 network flow is transmitted through a VLAN (Virtual Local Area Network).

11. The method as recited in claim 1, wherein each of the plurality of network flow records is defined in either a NetFlow format, or an IPFIX (Internet Protocol Flow Information Export) format, or a combination of NetFlow and IPFIX formats.

12. A system for network flow visualization, comprising:
multiple network devices operating to transmit multiple network flows through a network, each of the multiple network devices including one or more internal interfaces; and
a computer operating to display a network topology of the network in a graphical user interface on a display connected to the computer, the network topology including graphical representations of the multiple network devices, of internal interfaces within the multiple network devices, and of network connections between the multiple network devices,
the computer operating to acquire a plurality of network flow records from each of the multiple network devices for a specified period of time,
wherein each of the plurality of network flow records is generated by a corresponding one of the multiple network devices and is uniquely associated with the corresponding one of the multiple network devices and is stored by the corresponding one of the multiple network devices,
wherein each of the plurality of network flow records includes information about a corresponding network flow through the corresponding one of the multiple network devices, and
wherein each of the plurality of network flow records is generated and stored separate from data of the corresponding network flow, and
wherein each of the plurality of network flow records includes data fields for
1) an identifier of the ingress interface through which the corresponding network flow entered the corresponding one of the multiple network devices, and 2) an identifier of an egress interface through which the corresponding network flow exited the corresponding one of the multiple network devices or an identifier of an internal interface at which the corresponding network flow terminated within the corresponding one of the multiple network devices, and 3) an internet protocol source address for the corresponding network flow, and 4) an internet protocol destination address for the corresponding network flow, and 5) a source port for the corresponding network flow, and 6) a destination port for the corresponding network flow;

the computer operating to correlate separate ones of the plurality of network flow records based on content of the data fields so as to create a common network data communication flow record as a combination of the correlated separate ones of the plurality of network flow records for the specified period of time, wherein each of the separate ones of the plurality of network flow records within the common network data communication flow record has 1) identical content in the data field for the internet protocol source address for the corresponding network flow, and 2) identical content in the data field for the internet protocol destination address for the corresponding network flow, and 3) identical content in the data field for the source port for the corresponding network flow, and 4) identical content in the data field for the destination port for the corresponding network flow;

the computer operating to repeat the correlating of separate ones of the plurality of network flow records based on content of the data fields so as to create a plurality of common network data communication flow records for the specified period of time;

the computer operating to aggregate some of the plurality of common network data communication flow records based on identical content in one or more data fields of the plurality of common network data communication flow records to create an aggregated network communication flow record for the specified period of time, and the computer operating to render on the display an animation of a graphical representation of the aggregated network communication flow record for the specified period of time, wherein the animation of the graphical representation of the aggregated network communication flow record is rendered in lieu of rendering graphical representations of the plurality of common network data communication flow records represented by the aggregated network communication flow record, the animation of the graphical representation of the aggregated network communication flow record including one or more arrows to represent a data communication path traversed through the network topology by network flows represented by the aggregated network communication flow record, wherein the animation of the graphical representation of the aggregated network communication flow record includes at least one arrow depicting a segment of the data communication path traversed inside of at least one of the multiple network devices, and the computer operating to provide a control within the graphical user interface to control a temporal progression through the animation of the graphical representation of the aggregated network communication flow record, including pausing of the animation at a selected time within the specified period of time.

13. The system as recited in claim 12, wherein each of the plurality of network flow records identifies other internal interfaces within the corresponding one of the multiple network devices to which the corresponding network flow was transmitted.

14. The system as recited in claim 13, wherein the other internal interfaces includes a local interface at which the corresponding network flow was terminated within the corresponding one of the multiple network devices.

15. The system as recited in claim 12, wherein the multiple network devices includes a router, and wherein a given network flow record is generated for a packet of network traffic that is forwarded within the router.

16. The system as recited in claim 12, wherein the computer operates to filter the plurality of network flow records based on one or more network flow parameters to identify a filtered set of the plurality of network flow records, and the computer operating to render on the display graphical representations of transmission paths of the filtered set of the plurality of network flow records.

17. The system as recited in claim 16, wherein the computer operates to render on the display a control graphical user interface for defining, saving, and applying the filtering of the plurality of network flow records.

18. The system as recited in claim 17, wherein the one or more network flow parameters include one or more of a DSCP (Differentiated Services Code Point), port, IP (Internet Protocol) address, layer 4 protocol, bit rate range, byte range, VLAN (Virtual Local Area Network) tag parameter, MAC (Media Access Control) parameter, and TCP (Transmission Control Protocol) flag field.

19. The system as recited in claim 16, wherein the computer operates to modify an appearance of one or more of the graphical representations of the transmission paths of the filtered set of the plurality of network flow records based on network flow parameters.

20. The system as recited in claim 12, wherein each of the plurality of network flow records is defined in either a NetFlow format, or an IPFIX (Internet Protocol Flow Information Export) format, or a combination of NetFlow and IPFIX formats.

* * * * *